United States Patent
Dismukes et al.

(10) Patent No.: US 12,286,714 B2
(45) Date of Patent: *Apr. 29, 2025

(54) NICKEL PHOSPHIDE CATALYSTS FOR DIRECT ELECTROCHEMICAL CO2 REDUCTION TO HYDROCARBONS

(71) Applicant: Rutgers, The State University of New Jersey, New Brunswick, NJ (US)

(72) Inventors: G. Charles Dismukes, Princeton, NJ (US); Anders Bo Laursen, Cranford, NJ (US); Karin Ute Doehl Calvinho, Naperville, IL (US)

(73) Assignee: RUTGERS, THE STATE UNIVERSITY OF NEW JERSEY, New Brunswick, NJ (US)

( * ) Notice: Subject to any disclaimer, the term of this patent is extended or adjusted under 35 U.S.C. 154(b) by 1017 days.

This patent is subject to a terminal disclaimer.

(21) Appl. No.: 16/878,165

(22) Filed: May 19, 2020

(65) Prior Publication Data

US 2020/0347502 A1 Nov. 5, 2020

Related U.S. Application Data

(63) Continuation-in-part of application No. 15/765,896, filed as application No. PCT/US2016/056026 on Oct. 7, 2016, now Pat. No. 10,676,833.

(60) Provisional application No. 62/239,389, filed on Oct. 9, 2015.

(51) Int. Cl.
| | |
|---|---|
| C25B 11/091 | (2021.01) |
| B01J 23/72 | (2006.01) |
| B01J 27/185 | (2006.01) |
| B01J 35/33 | (2024.01) |
| B01J 35/40 | (2024.01) |
| C25B 3/25 | (2021.01) |
| C25B 9/65 | (2021.01) |
| C25B 11/02 | (2021.01) |

(52) U.S. Cl.
CPC ............. *C25B 11/091* (2021.01); *B01J 23/72* (2013.01); *B01J 27/1853* (2013.01); *B01J 35/33* (2024.01); *B01J 35/40* (2024.01); *C25B 3/25* (2021.01); *C25B 9/65* (2021.01); *C25B 11/02* (2013.01)

(58) Field of Classification Search
None
See application file for complete search history.

(56) References Cited

U.S. PATENT DOCUMENTS

| | | | |
|---|---|---|---|
| 8,845,878 B2 | 9/2014 | Cole et al. | |
| 9,350,011 B2 | 5/2016 | Sakaguchi et al. | |
| 10,358,727 B2 | 7/2019 | Dismukes et al. | |
| 2012/0308903 A1* | 12/2012 | Masel | B01J 31/0209 564/8 |
| 2013/0178360 A1 | 7/2013 | Lewis et al. | |
| 2014/0027303 A1 | 1/2014 | Cole et al. | |
| 2018/0023198 A1* | 1/2018 | Graetzel | C25B 3/25 205/391 |
| 2018/0282885 A1* | 10/2018 | Dismukes | C25B 11/091 |

FOREIGN PATENT DOCUMENTS

| | | |
|---|---|---|
| WO | 20150102618 A1 | 7/2015 |
| WO | 2017062788 A1 | 4/2017 |

OTHER PUBLICATIONS

Sampson et al (Manganese Electrocatalysts with Bulky Bipyridine Ligands: Utilizing Lewis Acids to Promote Carbon Dioxide Reduction at Low Overpotentials, J. Am. Chem. Soc., 2016, 138, 1386-1393). (Year: 2016).*
Qiu et al (Tuning the electrocatalytic properties of a Cu electrode with organic additives containing amine group for CO2 reduction, J. Mater. Chem. A, 2019, 7, 5453-5462). (Year: 2019).*
Schizodimou et al (Acceleration of the reduction of carbon dioxide in the presence of multivalent cations, Electrochimica Acta 78 (2012) 171-176). (Year: 2012).*
Wikipedia: "Ethylene Glycol", Dec. 31, 2019, Retrieved from the Internet: <https://en.wikipedia.org/w/Index.php?title=Ethylene_glycol&oldid=933356547>.
Yu et al: "Mesoscopic Structure Facilitates Rapid CO2 Transport and Reactivity in CO2 Capture Solvent", Journal of Physical Chemistry Letters, 2018, vol. 9, pp. 5765-5771.
Zhanaidarova et al: "Chelated [Zn(cyclam)]+2 Lewis Acid Improves the Reactivity of the Electrochemical Reduction of CO2 by Mn Catalysts with Bulky Bipyridine Ligands", Dalton Transactions, 2017, vol. 46.
Pu et al: "Ni2P Nanoparticle Films Supported on a Ti Plate as an Efficient Hydrogen Evolution Cathode", Nanoscale, 2014, vol. 6, pp. 11031-11034.
Zhang, et al: "Competition Between CO2 Reduction and H2 Evolution on Transition-Metal Electrocatalysts", ACS Catalysis, 2014, vol. 4, pp. 3742-4748.
Gasque, et al: "The Catalysis of CO2 Electroreduction and Related Processes", Department of Physics, Technical University of Denmark, 2013, pp. 1-202.
Chen, et al.: "Electrochemical Reduction of Carbon Dioxide to Ethane Using Nanostructured Cu2O-Derived Copper Catalyst and Palladium(II) Chloride", J. Phys. Chem. C 2015, 119, pp. 26875-26882, DOI 10.1021/acs.jpcc.5b09144.

(Continued)

*Primary Examiner* — Michael Forrest
(74) *Attorney, Agent, or Firm* — FOX ROTHSCHILD LLP

(57) ABSTRACT

Disclosed are cathodes comprising a conductive support substrate having an electrocatalyst coating containing nickel phosphide nanoparticles. The conductive support substrate is capable of incorporating a material to be reduced, such as $CO_2$ or CO. A co-catalyst, either incorporated into the electrolyte solution, or adsorbed to, deposited on, or incorporated into the bulk cathode material, provides increased selectivity and activity of the nickel phosphide electrocatalyst. Also disclosed are electrochemical methods for selectively generating hydrocarbon and/or carbohydrate products from $CO_2$ or CO using water as a source of hydrogen.

19 Claims, 11 Drawing Sheets

(56) References Cited

OTHER PUBLICATIONS

Choi, et al.: "High Performance Fe Porphyrin/Ionic Liquid Co-catalyst for Electrochemical CO2 Reduction", Chem. Eur. J. 2016, 22, pp. 14158-14161, DOI: 10.1002/chem.201603359.

Sun, et al.: "Very highly efficient reduction of CO2 to CH4 using metal-free N-doped carbon electrodes", Chem. Sci., 2016, 7, pp. 2883-2887, DOI: 10.1039/c5sc04158a.

Sun et al: "Bifunctional Hybrid Ni/Ni2P Nanoparticles Encapsulated by Graphitic Carbon Supported with N, S Modified 3D Carbon Framework for Highly Efficient Overall Water Splitting", Advanced Materials Interfaces, Jun. 13, 2018, vol. 5, No. 15, XP093176111, DE ISSN: 2196-7350, DOI: 10. 1002/admi.201800473. Retrieved from the Internet: <URL: https://api.wiley.com/onlinelibrary/tdm/v1 /articles/ 10.1002%2Fadmi.201800473>.

Zhou et al: "Dopant-induced electron localization drives CO2 reduction to C2 hydrocarbons", Nature Chemistry, Sep. 2018, vol. 10, pp. 974-980, XP036573538, ISSN: 1755-4330, DOI: 10.1038/S41557-018-0092-X.

\* cited by examiner

NICKEL PHOSPHIDE CATALYSTS FOR DIRECT ELECTROCHEMICAL CO2 REDUCTION TO HYDROCARBONS

CROSS REFERENCE TO RELATED APPLICATIONS

This application is a Continuation in Part (CIP) of U.S. patent application Ser. No. 15/765,896, filed on Apr. 4, 2018, which is the US National Stage entry of International Application No. PCT/US16/56026, filed on Oct. 7, 2016, which claims the benefit of priority pursuant to 35 U.S.C. § 119(e) of U.S. Provisional Patent Application No. 62/239,389, filed on Oct. 9, 2015. The disclosures of all of the above are incorporated herein by reference in their entirety.

FIELD OF INVENTION

The present invention relates to novel nickel phosphide electrocatalyst for the direct electrochemical reduction of carbon dioxide and/or carbon monoxide to hydrocarbons, carbohydrates and other useful products, collectively referred to below as oxygenated hydrocarbons.

BACKGROUND

Dwindling conventional fossil resources are amongst the greatest global challenges currently being faced, and this has rightly spurred ever increasing research efforts into new utilizations of renewable energy resources. The intermittent nature of most renewable energy sources (e.g. solar and wind) entails a need for energy storage. Energy can be stored safely and conveniently as chemical bonds. Methane reduced from $CO_2$ is one such possible energy carrier. This energy carrier could then be introduced in a closed loop cycle, with recovery of the spent carrier ($CO_2$) from the atmosphere making the technology carbon neutral—provided a renewable energy source such as sunlight or wind is used to drive the process. Furthermore, the recent utilization of fossil natural gas resources in the US has spurred a large investment in industries relying on cheap natural gas. Renewable methane production from $CO_2$ reduction would support this industry beyond the lifetime of the current fossil resources and thus gradually increase the market for these new technologies.

Electrochemical reduction of $CO_2$ (Direct $CO_2$ Reduction Reaction, DCRR) uses water to perform hydrogenation, producing alcohols on noble metals and alkanes on Cu. These technologies are still severely limited from making a significant impact by at least the following factors: competition from significant $H_2$ production (by-product) in water, high cost for the more active noble metal electrocatalysts, and the low product selectivity to a single alkane/alkene product when using cheaper Cu electrocatalysts.

Thus, cheaper, more energy efficient and more selective DCRR catalysts are eagerly sought that can be tuned to produce a variety of useful carbon-based products.

SUMMARY OF THE INVENTION

Improved and more efficient catalysts and methods for DCRR are provided by the present invention.

In the present disclosure, all surface-bound intermediates are designated by an asterisk (*). While it might seem reasonable to propose to use the least active $H_2$ evolution electrocatalysts (e.g., $SnO_2$), efficient reduction of $CO_2$ and CO to hydrogenated products requires an electrocatalyst that forms surface-bound hydrogen species (*H) (such species include hydrides ($H^{\delta-*}$), atomic hydrogen (H*), and/or partially reduced protons ($H^{\delta+*}$); where δ is between 0-1, which are collectively referred to as hydrides), which are the same precursors needed to produce $H_2$ in water. Therefore, understanding and controlling the types of surface hydrides and their relative reactivity with water vs $CO_2$/CO is an important factor in achieving selective DCRR electrocatalysts.

It has now been discovered that the previously disclosed electrocatalysts based on transition metal phosphides for the electroreduction of $CO_2$ to hydrocarbons (U.S. patent application Ser. No. 15/765,896) may be further tailored for high-efficiency and greater product selectivity by using co-catalysts for the reduction of carbon dioxide and/or carbon monoxide. The presently claimed co-catalysts encompass all possible additives to the binary compounds of nickel and phosphorous that modify the performance of the catalytic process without being consumed themselves. Additives can include any element or compound which is not a binary compound of nickel and phosphorus (i.e., a nickel phosphide), under 50% by weight of the composition.

This co-catalyst binds to a reaction intermediate on the surface: 1) influencing the intermediate's binding orientation, and/or 2) activating the intermediate for subsequent reaction with surface-bound hydrides or other $CO_2$/CO reaction intermediates, and/or 3) influencing the intermediate's binding strength to become stronger or weaker, and/or 4) facilitating the formation of new reaction intermediates on the surface.

The addition of the co-catalyst changes the overall rate of product formation and the product selectivity. For example, it can decrease or increase the amount of $H_2$ formed, or alter the partitioning among the following chemical classes of carbon products: hydrocarbons, carboxylic acids, aldehydes, ketones, ethers, and alcohols (either aromatic or aliphatic). The co-catalyst acts together with the electrocatalyst to achieve this overall outcome without requiring a separate stage or reactor. The co-catalyst acts either directly on the transition metal phosphide electrocatalyst by binding to it (so-called "push effect"), or by binding to any of the surface-bound reaction intermediates (so-called "pull effect"), or by activating reaction intermediates (that may or may not form on the transition metal phosphide electrocatalyst) for reaction with the surface-bound species on the transition metal phosphide. The co-catalyst can be immobilized on the electrocatalyst in a subsequent synthesis step, incorporated directly during electrocatalyst synthesis, or dissolved in the electrolyte solution together with the reactants.

The improved product selectivity provided by such a co-catalyst enables an electrochemical method for producing purer compounds that require less processing. For example, ethylene glycol can be produced from $CO_2$, water, and renewable electricity, which would allow green and sustainable polymers to be produced for various markets. Ethylene glycol and related diols are commercially used as monomers in polymer production. Similarly, a variety of other feedstocks and monomers can be made from $CO_2$, such as the $C_3$ compound, methylglyoxal (1,2-propanedione; MEG), and the $C_5$ compound mixture of 3-hydroxy-2-furancarboxaldehyde and 2-hydroxy-3-furancarboxaldehyde, which mixture has possible utility as an octane booster in fuels.

One aspect of the invention is directed to a combination of 1) a cathode for direct electrochemical reduction of carbon dioxide and carbon monoxide to oxygenated hydrocarbon products, the cathode comprising a conductive support substrate and an electrocatalyst coating, the electrocatalyst coating comprising nanoparticles of $Ni_xP_y$, (also referred to herein as "Ni—P") where x and y represent integers such that the compounds are selected from the group consisting of $Ni_3P$, $Ni_5P_2$, $Ni_{12}P_5$, $Ni_2P$, $Ni_5P_4$, $NiP_2$, and $NiP_3$; or the electrocatalyst coating comprising nanoparticles of $Ni_xP_y$ is selected from the group consisting of $Ni_3P$, $Ni_5P_2$, $Ni_{12}P_5$, $Ni_2P$, $Ni_5P_4$, $NiP_2$, and $NiP_3$, and further alloyed with $Fe_2P$, where the alloy has a Ni—P:$Fe_2P$ ratio between about 99:1 and 1:99 wt %; where the conductive support substrate comprises hydrophobic regions and hydrophilic regions to aid in adsorption of carbon dioxide and/or carbon monoxide from gas or aqueous phase to achieve separation from water molecules, where at least some of the electrocatalyst nanoparticles are located in the hydrophobic regions of the conductive support substrate and catalytically interact with the carbon dioxide and/or carbon monoxide by electrical reduction to produce oxygenated hydrocarbon products; and 2) a co-catalyst for the reduction of carbon dioxide and/or carbon monoxide, other than a nickel phosphide, positioned to act together with the electrocatalyst.

The co-catalyst can comprise an acid; the acid can be selected from a Lewis acid or a Bronsted-Lowry acid. The acid can be selected from $Zn^{+2}$, $Fe^{+2}$, $Fe^{3+}$, $Ca^{2+}$, $Mg^{2+}$, $Al^{+3}$, $AlO^+$, $Si^{4+}$, $SiO^{2+}$, $H_3BO_3$, $H_xBO_yR_z$ (where x, y, and z are each independently 0 or an integer selected from 1 to 3, wherein $-(x+(-2y)+(z\cdot n))=-5$ or $-1$ or 0 or 1 or 2 or 3, where n is $-1$, $-2$, or $-3$ for various substitutions on R). so that boric acid esters include, for example, $B(OH)_2(OR)$ and $B(OH)(OR)_2$, where R=alkyl, aryl, arylalkyl, heteroaryl, heteroarylalkyl, where the heteroatoms of heteroayl and heterarylalkyl are selected from nitrogen, oxygen and sulfur), and mixtures of two or more thereof.

The co-catalyst can comprise a base; the base can be selected from a Lewis base or a Bronsted-Lowry base. The base can be selected from the group consisting of $NH_3$, carbamide, urea, hydrazine, primary amines, secondary amines, tertiary amines, pyridines, and mixtures of two or more thereof.

The cathode can be in contact with an electrolyte solution comprising the co-catalyst or the co-catalyst can be an ionic liquid electrolyte that possesses $HCO_3^-$ or $CO_3^{2-}$ or $H^+$ transport functionality and is in contact with the cathode. Alternatively, the co-catalyst can comprise an ionomer or a conducting polymer.

Further, the co-catalyst can comprise a salt of Cu, Ag, Au, Zn, mixtures of two or more thereof, or salts or oxides thereof. The salt or oxides may also become soluble at an appropriate pH. Alternatively, the co-catalyst can comprise a simple metal or alloy selected from the group consisting of Cu, Ag, Au, Zn, and intermetallic compounds thereof. The co-catalytic metal or intermetallic compounds can be in the form of nanoparticles.

Without wishing to be bound by any particular theory, it is believed that the co-catalyst of the above combination binds to a reaction intermediate on the electrocatalyst surface and 1) influences the intermediate's binding orientation, and/or 2) activates the intermediate for subsequent reaction with surface-bound hydrides or other $CO_2$/CO reaction intermediates, and/or 3) influences the intermediate's binding strength to become stronger or weaker, and/or 4) facilitates the formation of new reaction intermediates on the surface.

The cathode can be in contact with the electrolyte solution comprising the co-catalyst with the conductive support further comprising the same co-catalyst. The conductive support substrate can further incorporate a material to be reduced, whereby the electrocatalyst coating catalytically interacts with the material to be reduced which is incorporated into the conductive support substrate. Preferably the material to be reduced comprises carbon dioxide, carbon monoxide, or a mixture thereof. Alternatively, the conductive support substrate can be an ionomer or a conducting polymer.

Another aspect of the invention is directed to a method for generating oxygenated hydrocarbon products from water, carbon dioxide and/or carbon monoxide via an electrolysis reaction, performed by: (a) placing the cathode of the above combination in an electrolyte together with an anode; (b) placing the anode and cathode in conductive contact with an external source of electric current; (c) providing a carbon source of carbon dioxide and/or carbon monoxide to the cathode; and (d) applying the electric current to drive an electrolysis reaction at the cathode, whereby oxygenated hydrocarbon products are generated selectively from the carbon dioxide and/or carbon monoxide. In the method, the electrocatalyst and co-catalyst are selected to generate a product selected from 2,3-furandiol, 2-formylfuran-3-ol, ethylene glycol, 1,3-propanediol, 1,2-propanediol, stereoisomers thereof, and combinations thereof.

Preferably the source of carbon dioxide and/or carbon monoxide is a flowing source. The flowing source can be a flow reactor.

A further aspect of the invention is directed to a method for reduction of carbon dioxide to oxygenated hydrocarbon products, performed by: (a) placing a cathode in an aqueous electrolyte together with an anode and a co-catalyst including an acid or a base or a charged ionic species, where the cathode includes a conductive support substrate, co-catalyst comprising an acid or a base or a charged ionic species, and an electrocatalyst coating including nanoparticles of $Ni_xP_y$, where x and y represent integers such that the compounds are selected from $Ni_3P$, $Ni_5P_2$, $Ni_{12}P_5$, $Ni_2P$, $Ni_5P_4$, $NiP_2$, and $NiP_3$, where the co-catalyst can be on the conductive support, in the electrolyte, or both; (b) placing the anode and cathode in conductive contact with an external source of electric current; (c) providing a flowing source of carbon dioxide to the cathode; and (d) applying the electric current to drive an electrolysis reaction that generates electrons at the anode that are delivered to the cathode, whereby oxygenated hydrocarbon product is generated from the carbon dioxide, electrons and water, and the electrocatalyst and co-catalyst are selected so that the oxygenated hydrocarbon product that is generated is selected from carbohydrates, carboxylic acids, aldehydes, ketones and mixtures of two or more thereof.

Another aspect of the invention is directed to a method for reducing carbon dioxide to oxygenated hydrocarbon products, performed by: (a) placing a cathode in an electrolyte together with an anode and a co-catalyst, where the cathode includes a conductive support substrate and an electrocatalyst coating, the electrocatalyst coating includes nanoparticles of $Ni_xP_y$ where x and y are integers such that the compounds are selected from $Ni_3P$, $Ni_5P_2$, $Ni_{12}P_5$, $Ni_2P$, $Ni_5P_4$, $NiP_2$, and $NiP_3$, where the co-catalyst can be on the conductive support, in the electrolyte, or both; where the co-catalyst binds to an aldehyde, ketone or alcoholic functional group of a reaction intermediate, thereby activating it for further reaction with the electrocatalyst; (b) placing the anode and cathode in conductive contact with an external source of electric current; (c) providing a flowing source of carbon dioxide to the cathode; and (d) applying the electric current to drive an electrolysis reaction to generate electrons at the anode that are delivered to the cathode, where oxygenated hydrocarbon product is generated from the carbon dioxide, and the electrocatalyst and co-catalyst are selected so that the oxygenated hydrocarbon product that is generated is selected from carbohydrates, carboxylic acids, aldehydes, ketones and mixtures of two or more thereof. The co-catalyst can include a metal selected from Cu, Ag, Au, Zn and intermetallic compounds thereof. The co-catalytic metal or intermetallic compounds can be nanoparticles.

DETAILED DESCRIPTION OF THE INVENTION

Figure 1:
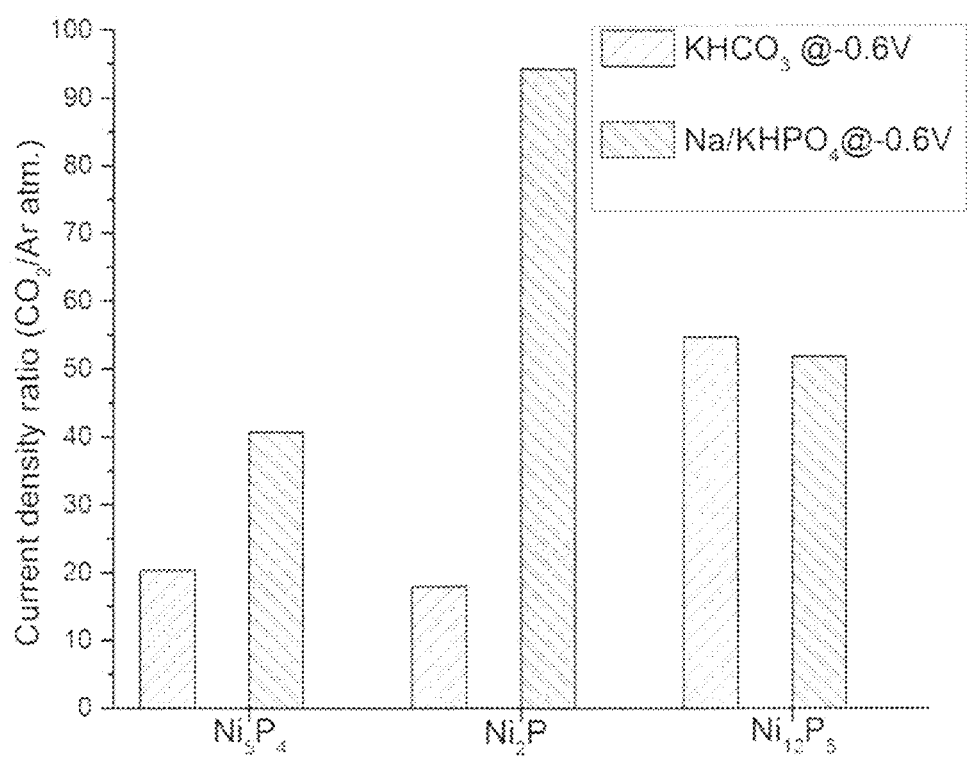
FIG. 1 shows the current density ratio (in $CO_2$ gas vs in Ar gas) for 3 different electrocatalysts ($Ni_5P_4$, $Ni_2P$ and $Ni_{12}P_5$) in potassium bicarbonate (electrolyte) and potassium hydrogen phosphate (co-catalyst). Electrical current difference between Argon and $CO_2$ purged solutions of carbonate and phosphate are displayed. The potential was corrected for the pH dependence of the standard $H_2$ electrode (i.e. reversible $H_2$ electrode, RHE).

The presently disclosed technology is directed to the preparation of oxygenated hydrocarbons that are common chemical feedstocks which can readily be handled by existing transport and export facilities.

The possibility of generating renewable chemicals and fuels by the reduction of gaseous $CO_2$ to form liquid fuels such as methanol, higher alcohols or hydrocarbons using renewable energy is the most direct route to a sustainable energy society. $CO_2$ reduction may be carried out by direct electrolysis at room temperature, but at least 4 electrons ($e^-$) are needed to form valuable fuels (eqs. 2-6). From the listed potentials it becomes evident that $CO_2$ reduction occurs in thermodynamic competition with the simpler 2 $e^-$ hydrogen evolution reaction (HER) (U=0 V vs. RHE at 1 atm. $H_2$).

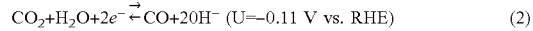

$$CO_2+H_2O+2e^- \rightleftharpoons CO+2OH^- \;(U=-0.11\text{ V vs. RHE}) \quad (2)$$

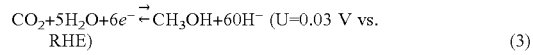

$$CO_2+5H_2O+6e^- \rightleftharpoons CH_3OH+6OH^- \;(U=0.03\text{ V vs. RHE}) \quad (3)$$

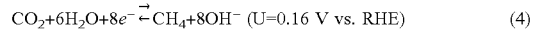

$$CO_2+6H_2O+8e^- \rightleftharpoons CH_4+8OH^- \;(U=0.16\text{ V vs. RHE}) \quad (4)$$

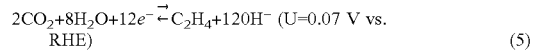

$$2CO_2+8H_2O+12e^- \rightleftharpoons C_2H_4+12OH^- \;(U=0.07\text{ V vs. RHE}) \quad (5)$$

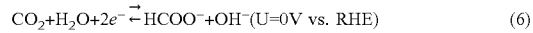

$$CO_2+H_2O+2e^- \rightleftharpoons HCOO^-+OH^- \;(U=0\text{V vs. RHE}) \quad (6)$$

Therefore, the challenge is to produce an electrocatalyst which preferentially provides hydrogen equivalents (H atoms or hydrides) to reduce $CO_2$ rather than reducing water or $H^+$. For this reason, DCRR has often been performed in neutral pH where the proton concentration at the electrocatalyst surface is low. This has been previously demonstrated experimentally on single component transition metal electrocatalysts, with the best selectivity for the production of alkanes from $CO_2$ reduction on Cu electrodes occurring in low ionic strength electrolytes (0.1 M $KHCO_3$, pH 6.8). Such results indicate selectivity towards hydrocarbons of 72.3% ($CH_4$ was the major product) achieved at −1.04V vs. the reversible hydrogen electrode ("RHE"), which is ~1.2 V more negative than the thermodynamic limit of +0.16V vs. RHE. However, such an immense over-potential greatly impedes the applicability of this approach to the production of synthetic fuels, but nonetheless remains the best performing single component transition metal DCRR electrocatalyst to date.

Although not wishing to be bound by any particular theory, it is believed that the mechanism of $CO_2$ reduction, at least on Cu, is as follows. As the potential is decreased from the reversible HER potential (−0.401 V vs. normal hydrogen electrode (NHE) under these conditions) $H_2$ is the major product until (−0.8 V). As the potential is further decreased the fraction of $H_2$ reduces as CO (−0.8 V) and then $HCOO^-$ (−0.9 V) are formed. It was thus concluded that CO is likely the first intermediate of $CO_2$ reduction on Cu. The appearance of $C_2H_4$ and $CH_4$ at more negative potentials further correlates with a decrease in CO and $HCOO^-$. Additional studies indicate that the mechanism involves the reduction of $CO_2$ to CO, which poisons the surface sites for the HER owing to surface-bound CO* inhibition of HER. Surface-bound CO* then reduces to HCO*, which remains bound to the Cu surface. The potential energy for the reduction of CO* to HCO* is uphill in energy until the applied potential reaches −0.74 V vs. RHE (−1.14V vs. NHE). This step is predicted to be the rate-limiting step for the overall process, and closely corresponds to the potential observed by others for the production of hydrocarbons.

With the proposed rate limiting step of the surface-bound CO* to HCO* reaction, the calculated CO* binding energy for several metal surfaces could be obtained, and the resulting plot finds Cu at the peak of a volcano-type curve (activity vs binding affinity). Again, without wishing to be bound by any particular theory, the minimal binding energy for CO* on Cu could potentially rationalize its current standing as the optimal surface for $CO_2$ reduction to hydrocarbons. Additionally, a second reason could be the suppression of HER by poisoning of the Cu sites that catalyze this reaction by the binding CO*.

It has been proposed that in order to design a better DCRR electrocatalyst, one must "break" the linear scaling relationship between CO* and HCO* binding to the electrocatalyst surface. The present working hypothesis predicts that electrocatalysts that bind HCO* more strongly than CO*, will be better at forming hydrogenated products. This could be done, for example, by devising strategies to bend the CO molecule from its preferred end-on binding perpendicular to the surface (*—CO), to a bent geometry allowing for hydrogenation of the C-atom. Binding of the oxygen of the CO molecule to a Lewis acid group in the proximity of the active site should therefore aid its reduction to CHO* by pulling it out of the perpendicular binding geometry to the surface.

It has recently been shown that a Cu-oxide derived Cu electrode shows improved activity for the reduction of CO to hydrocarbons (and alcohols) at a lowered overpotential of −0.4V vs. RHE. It was proposed that the high number of grain boundaries in these electrodes increases the reactivity towards CO reduction, with the surface-bound CO* molecule becoming distorted when binding at a grain boundary. Thus, for the active binary electrocatalyst compounds of the present invention, reactivity could be further increased by increasing the number of grain boundaries, for instance by agglomerating individual nanoparticles (vide infra).

A viable technology to produce fuels from $CO_2$ must quantitatively compare to industrial procedures. Currently, industrial methanol production from CO is estimated at 51% energy efficiency. The theoretical maximum energy efficiency for DCRR—assuming 0V over-potential and complete recovery of products—is 73%, indicating that DCRR is a technology theoretically capable of significantly outperforming the current industrial standard. Efficiency for the electrochemical reduction (also referred to herein as "electroreduction") of $CO_2$ to $CH_4$ is currently 13% on Cu surfaces assuming oxygen evolution is the anode reaction.

Also, the archetypical DCRR Cu electrocatalyst produces significant quantities of poisonous CO. CO is an energy-rich molecule that is a key intermediate in the proposed DCRR mechanism (vide supra). However, it is also an odorless toxic gas which requires specialized and expensive handling. It is thus of significant importance to design electrocatalysts such that CO is avoided as a liberated product altogether. This attribute is a major advance of the nickel phosphide electrocatalysts of the invention.

The replacement of electrocatalysts (electrodes) is an expensive down-time investment for any commercial process, hence it is critical to maintain extended life-times of excellent electrocatalyst performance. There is currently no example of tests exceeding 2 hours of DCRR on transition metal electrodes. The electrocatalysts of the invention target at least 16 hours of continuous activity. Industrial application requires significantly longer stabilities than hours. For example, industrial anodes for the chlor-alkali process (based on $RuO_x$ and $IrO_x$) have lifetimes of about 7 years.

$Ni_3P$, $Ni_{12}P_5$, $Ni_2P$, $Ni_5P_4$, and $NiP_2$ have now been synthesized as highly compacted powders forming approximately flat surfaces for the inventive family of direct $CO_2$ reduction electrocatalysts. This allows direct observation of catalytic activity on the most stable crystal phase termination, and is directly comparable to optimized Cu-foils of the prior art. Their activity as DCRR electrocatalysts is shown in the data below. The clear structural dependence on activity provides verification of the proposed ability to tune DCRR over HER activity on the inventive class of electrocatalysts. Further, six other distinct stable crystalline phases of the above binary compounds (the electrocatalysts) have been prepared as particulate catalysts and evaluated for their $H_2$ evolution activity. As expected, these seven structurally and compositionally distinct binary compounds show a wide range of intrinsic catalytic activities for the $H_2$ evolution reaction from water. Similarly, the selectivity of these electrocatalysts for DCRR was also found to be tunable based on composition and structure, and the DCRR selectivity was observed to be complementary to their observed HER activity. The high natural abundance of both Ni and P elements ensures the scalable production of these electrocatalysts for industrial applications.

Further, it has been discovered that binary Ni—P electrocatalyst compounds (versus single component transition metals) with specific structural motifs provide optimal binding of $CO_2$ for the reduction to hydrocarbons and oxygenated hydrocarbons, and out-compete the HER reaction. Based on the observed lower potentials required for DCRR on three model electrocatalysts, the surfaces of these electrocatalysts provide structural motifs that optimize the binding of the $CO_2$ reduction intermediates for DCRR (vide infra).

Further, anion exchange membranes allow for the transport of $CO_3^{2-}$ and neutral $CO_2$(aq) and $H_2O$ to the electrocatalyst surface, while restricting $H^+$ accessibility due to charge repulsion. DCRR activity is known to be sensitive to pH in that higher pH improves selectivity but limits $CO_2$ availability. Hence, locally restricting proton availability by using an anion exchange membrane, rather than increasing the pH of bulk solution, strongly favors DCRR over HER. Therefore, one aspect of the present invention is directed to a composite electrode of an inventive binary electrocatalyst and various polymers with anion conduction properties near the electrocatalyst surface.

In another aspect the use of an anionic ionomer may be replaced with a ionic liquid that possesses $HCO_3^-$ or $CO_3^{2-}$ or $H^+$ transport functionality. In other aspects of the invention the bicarbonate, carbonate, or $H^+$ functional groups are bound to either a polymer or a soluble molecule, where the soluble molecule can be of variable size: small, medium, or large.

Changing the Selectivity of $CO_2$ Electroreduction by the Addition of Co-Catalysts As defined herein co-catalysts encompass all possible additives to the binary compounds of nickel and phosphorous that modify the performance of the catalytic process without being consumed themselves. Additives include any element or compound that is not a binary compound of nickel and phosphorus, under 50% by weight of the composition.

This co-catalyst binds to a reaction intermediate on the surface: 1) influencing the intermediate's binding orientation, and/or 2) activating the intermediate for subsequent reaction with surface-bound hydrides or other $CO_2/CO$ reaction intermediates, and/or 3) influencing the intermediate's binding strength to become stronger or weaker, and/or 4) facilitating the formation of new reaction intermediates on the surface.

As such, the co-catalysts of the invention that are ionic are conjugate acid/base pairs and charged ions that are used together with the transition metal phosphide electrocatalysts as dopants incorporated during electrocatalyzed synthesis, co-deposited on the transition metal phosphide electrocatalyst, or added to the electrolyte bathing the electrodes. Other chemical terms used to denote these co-catalysts are Lewis acid/base pairs, Bronsted-Lowry acid/base pairs (also known as Bronsted acids/bases) and cations/anions, respectively. Particularly for those co-catalysts in the electrolyte solution, adjustment of pH can provide a mixture of acidic and conjugate base species. Thus, boric acid can be added to the electrolyte solution, and adjustment of pH provides a mixture of boric acid and borate species. Similarly, sodium borate can be added to the electrolyte solution, and adjustment of pH provides a mixture of boric acid and borate. In another aspect the co-catalyst is non-ionic and affects reaction on the transition metal phosphide electrocatalyst as a deposit on the surface (or as a dopant in the catalyst surface) binding reaction intermediates such that they can react with the transition metal phosphide surface, or DCRR intermediates bound to the transition metal phosphide electrocatalyst surface.

Figure 7:
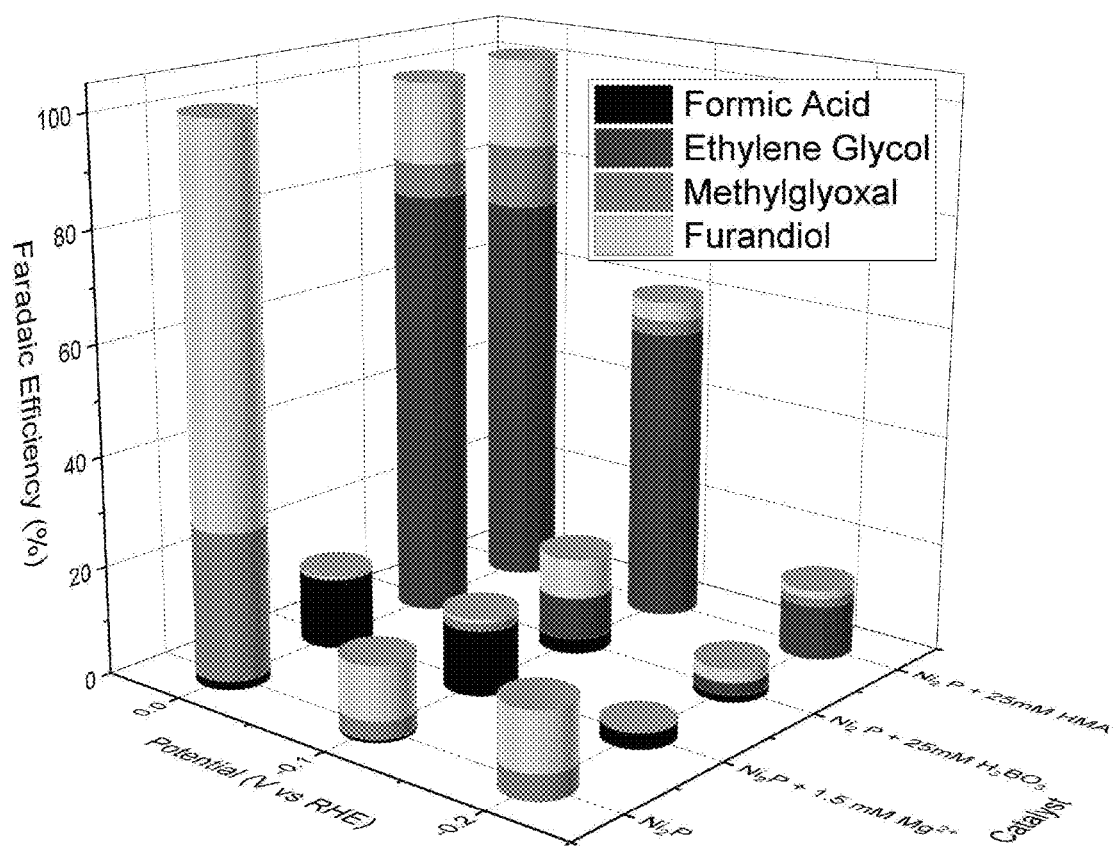
FIG. 7 graphs experimental results demonstrating that a change in selectivity occurs upon addition of the selected co-catalysts (boric acid, hexamethylene tetraamine (HMA)) to $Ni_2P$ at pH 7.5, in $CO_2$-saturated 0.5M $KHCO_3$.

It has now been shown that the product selectivity for $CO_2$ reduction on nickel phosphides can be greatly altered by addition of co-catalysts (i.e., species or materials that are not consumed and can exist either as soluble molecules in the electrolyte, adsorbed molecules on the electrocatalyst surface, incorporated into the electrocatalyst support or ionomer or conductive polymer, or as dopant ions throughout the electrocatalyst bulk). These two classes of co-catalysts are illustrated in FIG. 7 and its associated Table 1, showing the range of products and their yields that are formed independently on $Ni_2P$ using three different soluble co-catalysts at fixed pH (7.5) in electrolyte solution. A major shift in product selectivity occurs on addition of the Lewis acid-base pair boric acid/borate ($H_3BO_3/B(OH)_{4-}$) or the cationic Bronsted acid/base pair hexa-methylenetetramine ($C_6H_{12}N_4H^+/C_6H_{12}N_4$), predominantly to the $C_2$ product ethylene glycol (93% and 72%, resp.) relative to the baseline products (mainly $C_3+C_4$). The change in carbon selectivity vs the benchmark $Ni_2P$ electrocatalyst is preserved across a range of applied potentials, as shown in FIG. 7. By contrast, $Mg^{2+}$ (classified as a cation or Lewis acid) forms minimal C2 product and a low level of formic acid (below 15% max). As the applied negative bias is increased, the yield of oxygenated hydrocarbon products decreases in competition with increasing $H_2$ yield on all electrocatalysts with or without co-catalysts. This offers direct insight into the mechanism (see FIG. 8).

TABLE 1

Products and yields with or without soluble co-catalysts of the invention

| Catalyst | Potential (V vs RHE) | Formate Faradaic Efficiency (%) | Furandiol Faradaic Efficiency (%) | Methylglyoxal (MEG) Faradaic Efficiency (%) | Ethylene Glycol Faradaic Efficiency (%) |
|---|---|---|---|---|---|
| $Ni_2P$ | 0.00 | 1.6 | 72 | 27 | 0.0 |
|  | −0.10 | 0.6 | 10 | 3.2 | 0.0 |
|  | −0.20 | 0.0 | 11 | 4.6 | 0.0 |
| $Ni_2P$ + $Mg^{2+}$ | 0.00 | 13 | 0.6 | 0.2 | 0.0 |
|  | −0.10 | 12 | 0.9 | 1.4 | 0.0 |
|  | −0.20 | 3.0 | 0.2 | 0.0 | 0.0 |
| $Ni_2P$ + $H_3BO_3$ | 0.00 | 0.0 | 15 | 6.0 | 79 |
|  | −0.10 | 2.8 | 7.6 | 0.0 | 7.7 |
|  | −0.20 | 1.4 | 2.5 | 0.1 | 2.2 |
| $Ni_2P$ + Hexamethylene-tetramine | 0.00 | 0.0 | 16.6 | 11 | 73 |
|  | −0.10 | 0.0 | 3.6 | 2.7 | 54 |
|  | −0.20 | 0.0 | 1.6 | 1.5 | 10 |

Reaction Mechanism (FIGS. 8A-D)

Without wishing to be bound by any particular theory, we believe that the competition between surface-bound *$C_2$ intermediate and $H_2$ product indicates that the reaction forming the $C_2$ precursor to the final MEG product can dissociate from the electrocatalyst. This information guides as to which type of co-catalyst is needed to enhance the oxygenated hydrocarbon products over $H_2$.

Figures 8A, 8B, 8C, 8D:
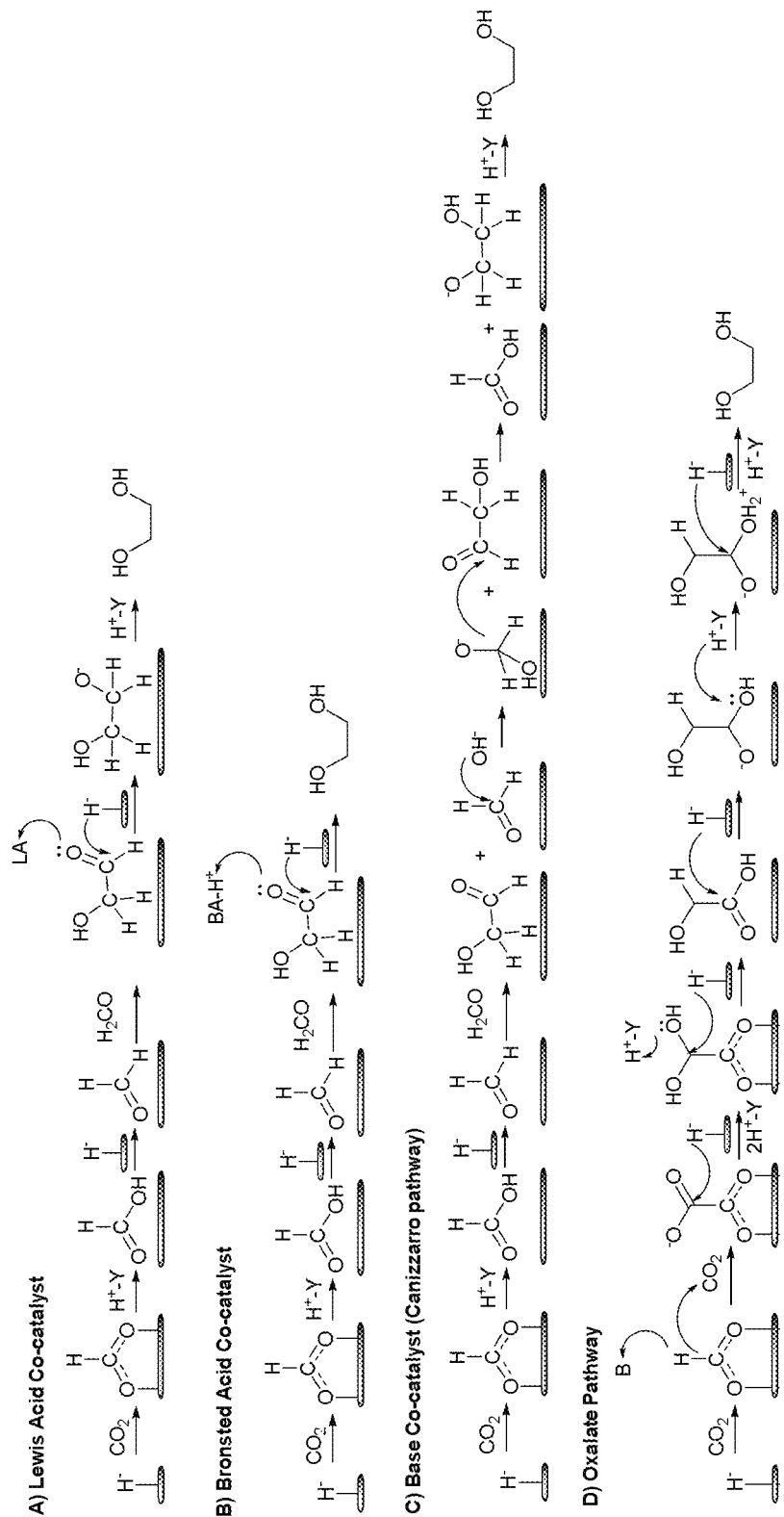
FIGS. 8A, 8B, 8C and 8D show proposed changes in mechanism caused by the addition of the aforementioned various co-catalysts.

FIGS. 8A and 8B. Glycoaldehyde reduction: Lewis (or Bronsted) acid activation of the aldehyde group of surface-bound glycoaldehyde*. This activates the aldehyde for reduction into the corresponding alcohol. This mechanism is supported by the activation at low pH.

FIG. 8C. Glycoaldehyde-formaldehyde disproportionation reaction: The Lewis or Bronsted base-catalyzed hydrolysis of surface-bound formaldehyde* sets up its disproportionation reaction with surface-bound glycoaldehyde* (by intermolecular hydride transfer) to form formic acid and ethylene glycol, respectively. The base-catalyzed disproportionation reaction of two carbonyls to produce a carboxylic acid and alcohol is an example of a class of reactions called the Cannizzaro reaction. The formic acid* product is further electro-reduced to formaldehyde* at the electrode surface and ultimately consumes all $CO_2$ to make ethylene glycol.

FIG. 8D. Oxalic acid pathway: A third possible pathway that fits the available data is $CO_2$ insertion into the C—H bond of surface-bound formic acid*. This step forms oxalate which can react further with surface hydride to generate ethylene glycol and water.

Ni$_2$P was prepared by solid state synthesis and pressed into a pellet. The tests were performed under the specified applied potentials in CO$_2$-saturated electrolyte (a solution containing 0.5 M KHCO$_3$ and one of the three co-catalysts selected from 25 mM hexamethylene tetraamine, 25 mM boric acid, or 1.5 mM Mg$^{2+}$. The tests were conducted at ambient pressure and temperature, at pH 7.5, for 16 h per experiment. Ambient temperature typically fell between 70 and 80° F. The composition of the headspace was monitored by gas chromatography, and the liquid products were analyzed by HPLC and NMR.

Figures 9A, 9B:
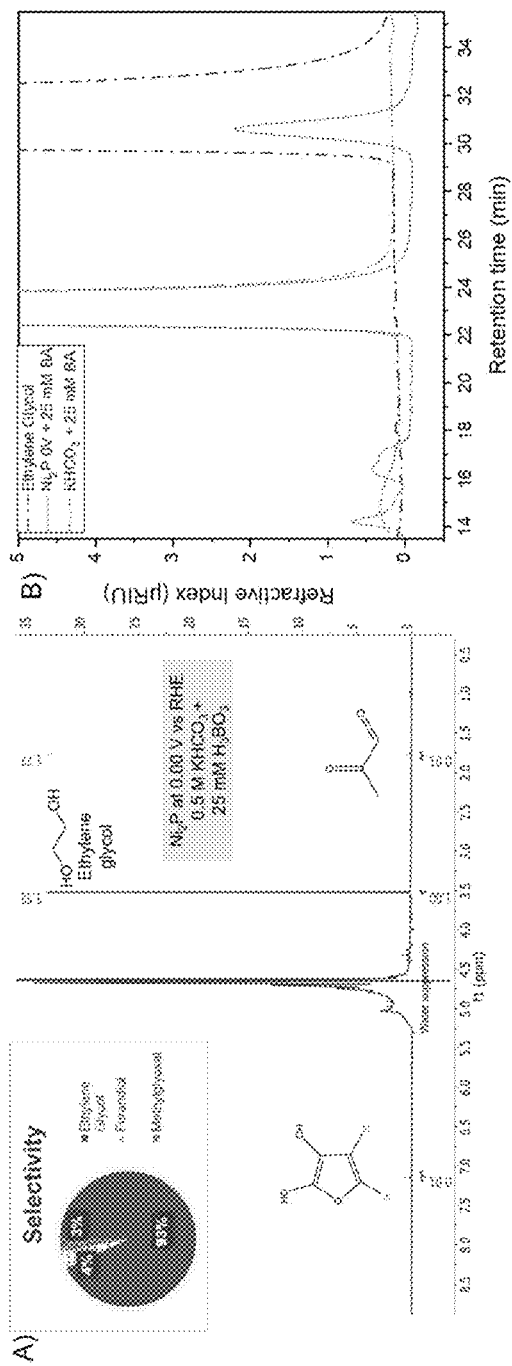
FIG. 9A shows $^1H$ NMR of products demonstrating change in selectivity upon addition of 25 mM boric acid. The electrocatalyst is a solid pellet of $Ni_2P$ at 0V vs RHE at pH 7.5.
FIG. 9B shows the corresponding HPLC (refractive index detector trace) demonstrating change in selectivity upon addition of 25 mM boric acid. The electrocatalyst is a solid pellet of $Ni_2P$ at 0V vs RHE at pH 7.5. Comparison is shown to the electrolyte blank and pure ethylene glycol standard.

FIG. 9A shows the $^1$H NMR of the electrolyte, where the major peak is ethylene glycol (as confirmed by the HPLC trace 9B), confirming the shift in selectivity caused by the addition of the co-catalyst.

The co-catalysts are effective when applied to all members of the nickel phosphide family of electrocatalysts disclosed above, including Ni$_3$P, Ni$_5$P$_2$, Ni$_{12}$P$_5$, Ni$_2$P, Ni$_5$P$_4$, NiP$_2$, and NiP$_3$ as well as the electrocatalyst nanoparticles of an alloy of one or more of the above Ni$_x$P$_y$ compounds and Fe$_2$P, where the alloy has a Ni—P:Fe$_2$P ratio of between 100:0 to 0:100 wt %, and preferably between about 99:1 and 1:99 wt %. Particularly preferred nickel phosphides for co-catalysis include Ni$_3$P, Ni$_{12}$P$_5$, Ni$_2$P, Ni$_5$P$_4$, and NiP$_2$.

The co-catalyst concentration in the electrolyte can range from very low up to its limit of solubility, and is typically about 0.1 mM to about 10 M. Preferably the concentration range of the co-catalyst is about 0.5 mM to about 5 M. Alternatively, the concentration range of the co-catalyst can be about 1 mM to about 1 M, or about 1 mM to about 100 mM, or about 1.5 mM to about 50 mM, or about 1.5 mM to about 25 mM. The concentration of soluble co-catalyst can range from about 0.1 mM to about 100 mM. The co-catalyst can be present in the electrolyte in about 1.5 mM or about 25 mM.

As disclosed herein, a number of ranges of values are provided. It is understood that each intervening value, to the tenth of the unit of the lower limit, unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither, or both limits are included in the smaller ranges is also encompassed within the invention, subject to any specifically excluded limit in the stated range. Where the stated range includes one or both of the limits, ranges excluding either or both of those included limits are also included in the invention. The term "about" generally includes up to plus or minus 10% of the indicated number. For example, "about 10%" may indicate a range of 9% to 11%, and "about 20" may mean from 18 to 22. Preferably "about" includes up to plus or minus 6% of the indicated value. Alternatively, "about" includes up to plus or minus 5% of the indicated value. Other meanings of "about" may be apparent from the context, such as rounding off, so, for example "about 1" may also mean from 0.5 to 1.4.

Alternatively, addition of a co-catalyst in the form of a second catalytic metal on the surface, or doping of another metal (or metal ion) into/on the surface, or within the bulk of the electrocatalyst is possible. The co-catalysts of the present invention encompass all possible additives to the binary compounds of nickel and phosphorous that modify the performance of the catalytic process without being consumed themselves.

This second co-catalytic metal or metal ion must be selected from a group that is known to facilitate the reduction of CO$_2$ or CO or other reaction intermediates from the DCRR. This includes, without limitation, metals such as Cu, Ag, Au, Zn, and intermetallic or oxide compounds thereof. The co-catalytic metal, intermetallic or oxide are preferably nanoparticles ranging in size from about 0.1 to about 1000 nm. The co-catalyst particle size can be about 0.5 nm to about 1000 nm, or about 0.5 nm to about 500 nm, or about 0.5 nm to about 50 nm, or about 0.5 nm to about 20 nm. The co-catalyst particle size can be about 0.1 nm to about 500 nm, or about 0.1 nm to about 50 nm, or about 0.1 nm to about 5 nm, or about 0.1 nm to about 2 nm.

Figure 10:
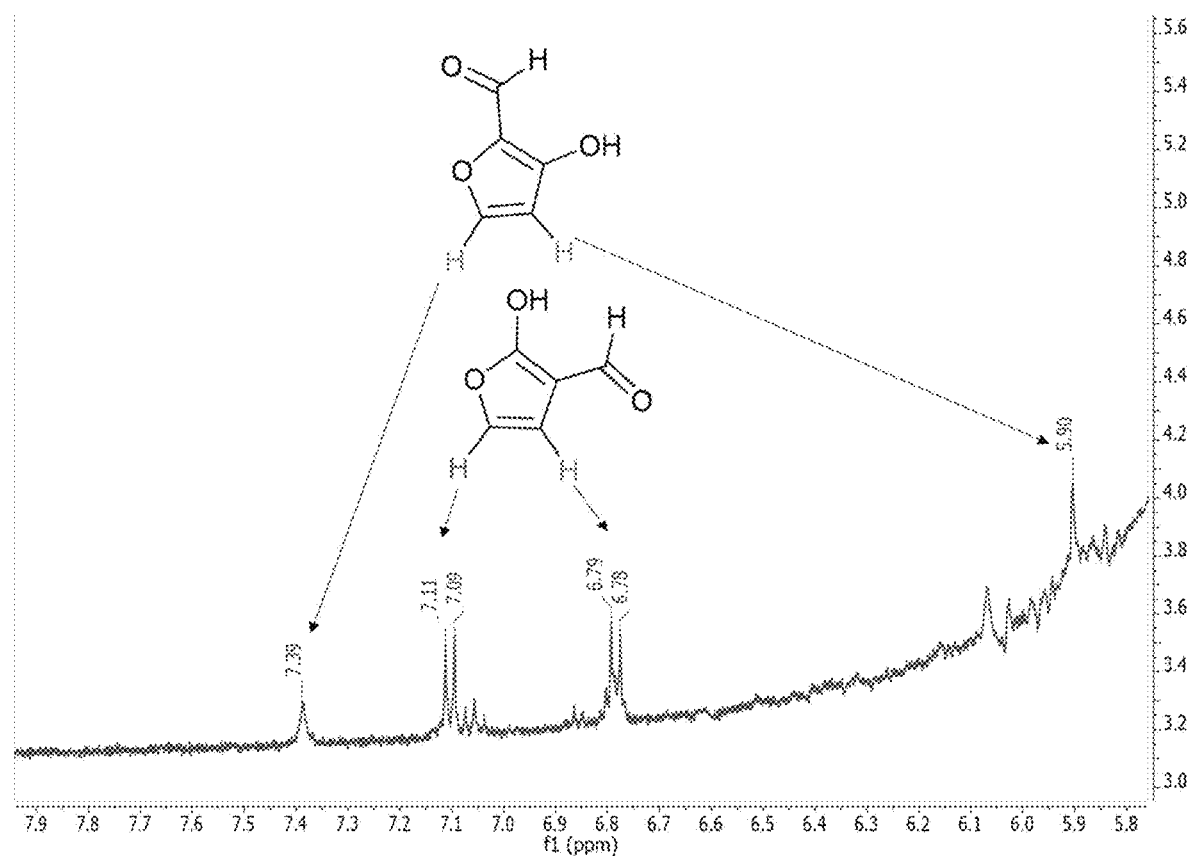
FIG. 10 shows a $^1H$ NMR spectrum demonstrating change in product selectivity upon deposition of Cu metal onto the electrocatalyst (solid pellet of $Ni_2P$ at 0V vs RHE at pH 1).

Deposition of such a co-catalyst on nickel phosphide alters the selectivity of the reaction by changing the populations and binding affinities of reaction intermediates on the surface. The $^1$H NMR spectrum in FIG. 10 shows the CO$_2$ reduction products formed upon electrodeposition of copper metal on Ni$_2$P nanoparticles, or soluble Cu salts on Ni$_2$P nanoparticles at 0V vs RHE and acidic pH. The data demonstrate the formation of two C$_5$ compounds (3-hydroxy-2-furancarboxaldehyde and 2-hydroxy-3-furancarboxaldehyde).

Metrics for Evaluating Successful DCRR Binary Electrocatalyst Design

For evaluating the binary electrocatalysts of the invention, the following parameters are used based on predictions made by quantum mechanical calculations:

Potential requirement: Cu is the state of the art electrocatalyst for the reduction of CO$_2$ to CH$_4$ and requires about −0.74V vs. RHE to initiate the reduction on a smooth surface. This limit has been confirmed by density functional theory (DFT) calculations, and it is understood this limit would apply to all monometallic electrocatalysts as well. Hence, a successful binary electrocatalyst is defined as an electrocatalyst showing CH$_4$ formation at potentials at or below −0.74V vs. RHE, thereby breaking the scaling relation of monometallic electrocatalysts. Other state of the art electrocatalysts include SnO$_2$ and In$_2$O$_3$.

Faradaic efficiency quantifies how much of the electrical charge is channeled successfully into the products. To date, DCRR generally suffers from low Faradaic efficiencies, and the state of the art Cu foil is merely ~30% for CH$_4$ at ca. −1V vs. RHE. It has been shown that starting from CO a combined efficiency of 5% towards ethane and ethylene could be achieved at only −0.4V vs. RHE (starting from CO$_2$ these hydrocarbons were not observed). For the purposes of the present invention the overall target of Faradaic efficiency is defined as ≥30% towards CH$_4$. For the initial screening of the pure electrocatalyst materials prior to modification a lower target of ≥5% was set.

Results

Figure 2:
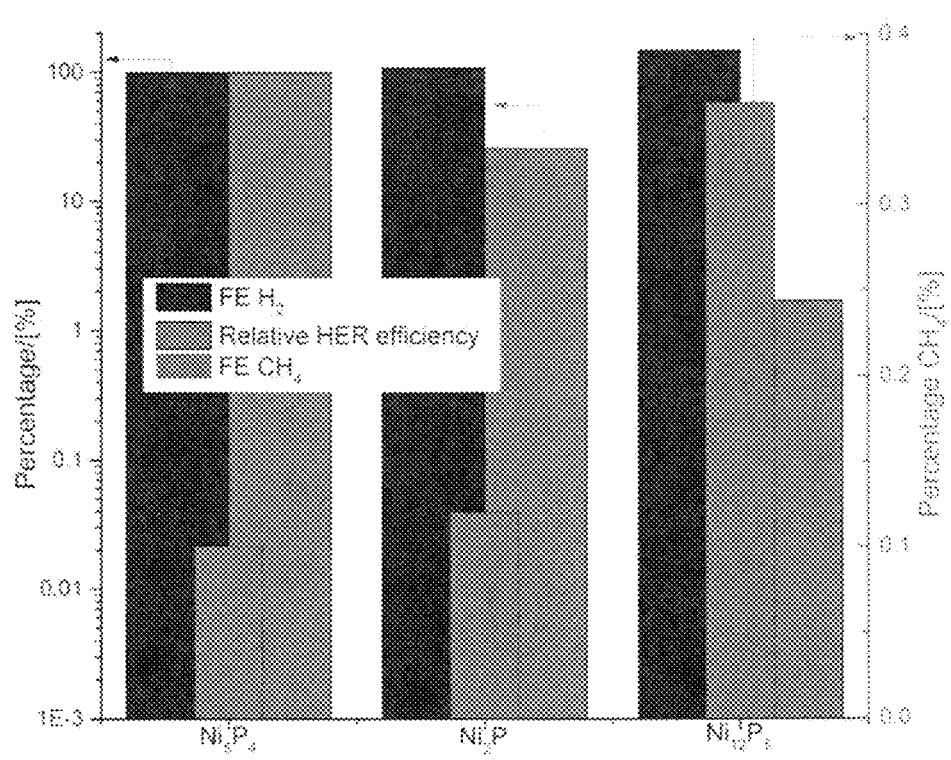
FIG. 2 shows the electrocatalyst comparison in $CO_2$ saturated 0.1M $KHCO_3$. Left axis: (black) Faradaic efficiency $H_2$ and (grey) Relative HER activity (0.5M $H_2SO_4$ 0.1V vs. reversible hydrogen electrode (RHE)). Right axis: (grey) Faradaic efficiency $CH_4$.
Figure 3:
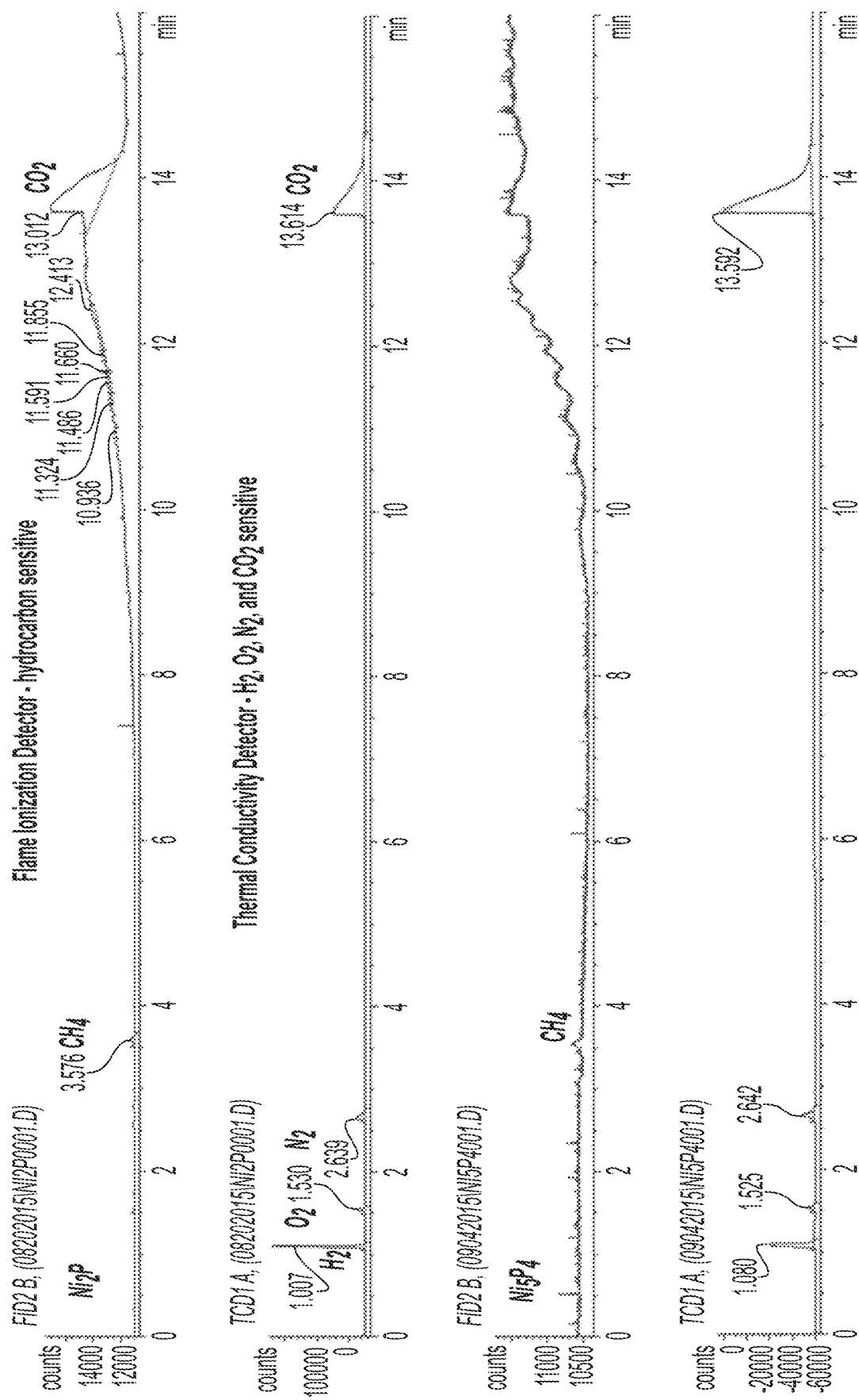
FIG. 3 shows representative gas chromatographic separations of the product gases following electrolysis of a $CO_2$ gas stream over three different solid nickel phosphide electrodes held at −0.7V vs. RHE in $CO_2$ saturated $KHCO_3$/ $K_2CO_3$ solution.
Figure 3:
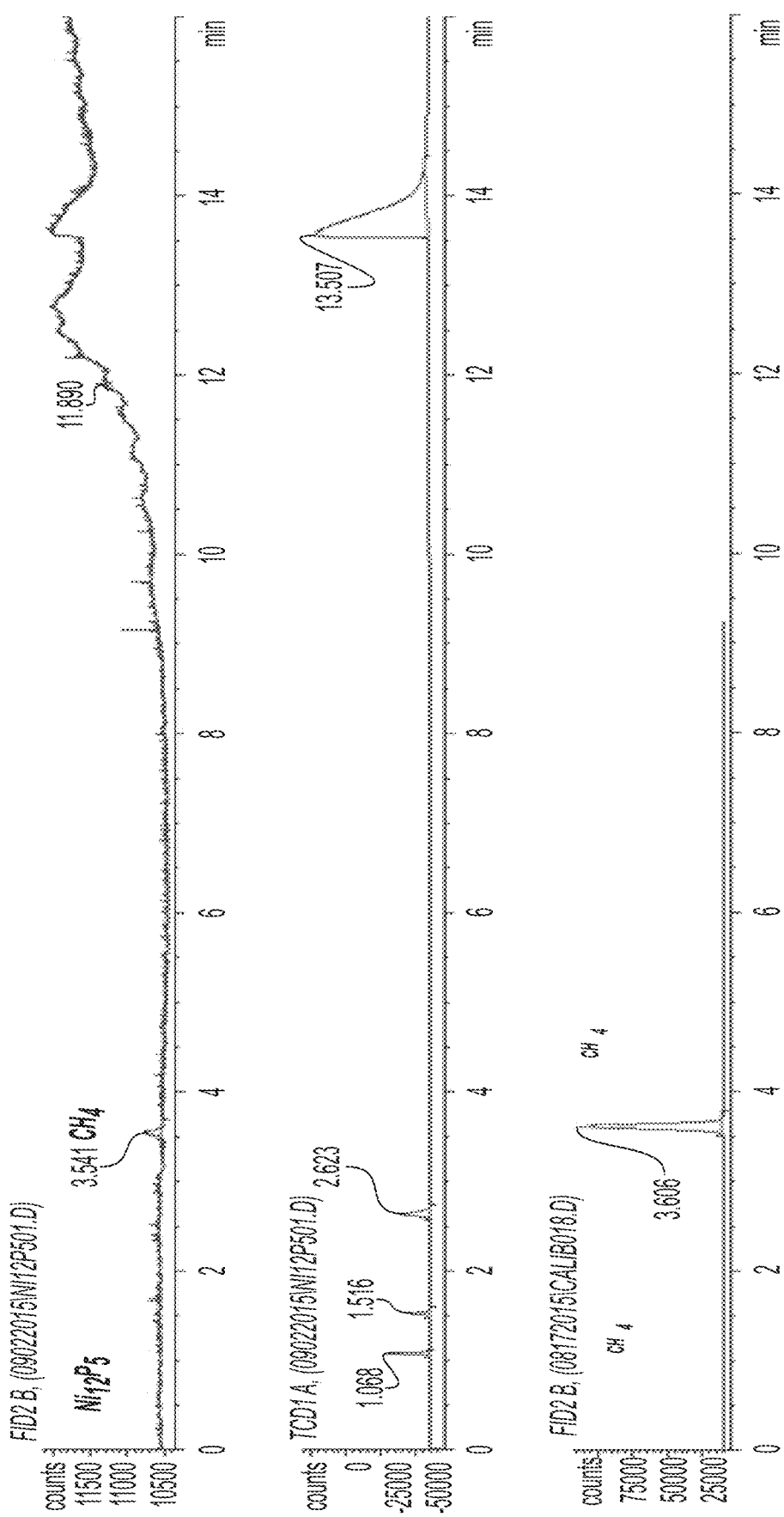
Figure 4:
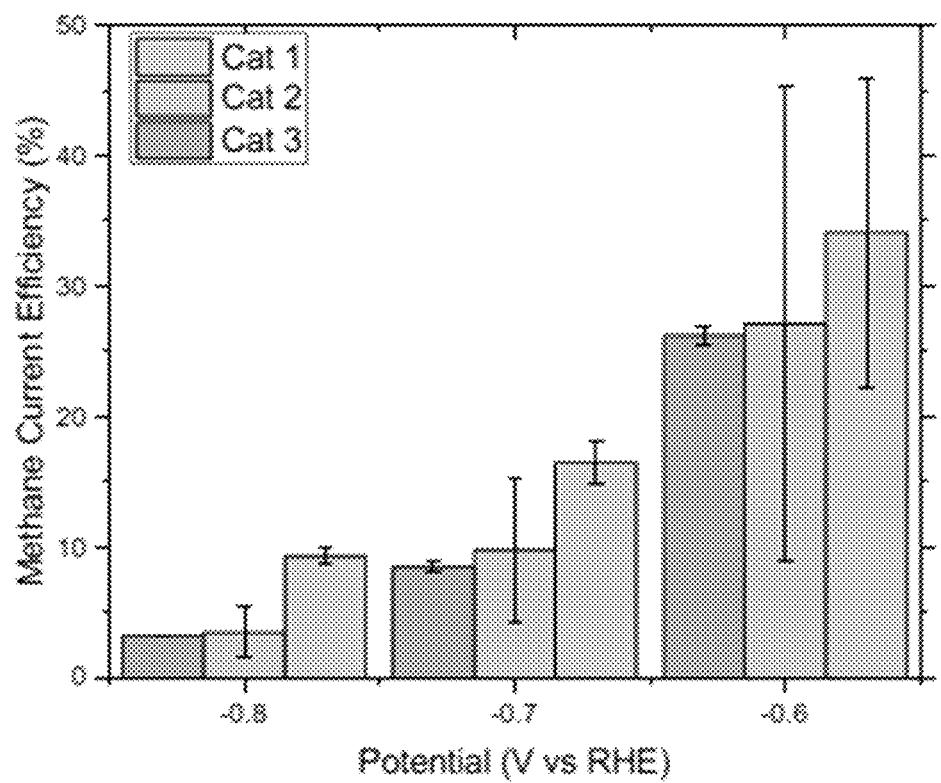
FIG. 4 shows current efficiencies for methane production by three different nickel phosphide electrocatalysts according to the present invention, measured at −0.6 V, −0.7 V and −0.8 V vs. RHE. Cat 1 (right hand bar in each group) is $Ni_{12}P_5$, Cat 2 (middle bar in each group) is $Ni_2P$, and Cat 3 (left hand bar in each group) is $Ni_5P_4$. Methane is the main carbon reduction product in an unstirred reactor with no flowing $CO_2$. The average of at least three measurements is depicted with error bars corresponding to one standard deviation.
Figure 5:
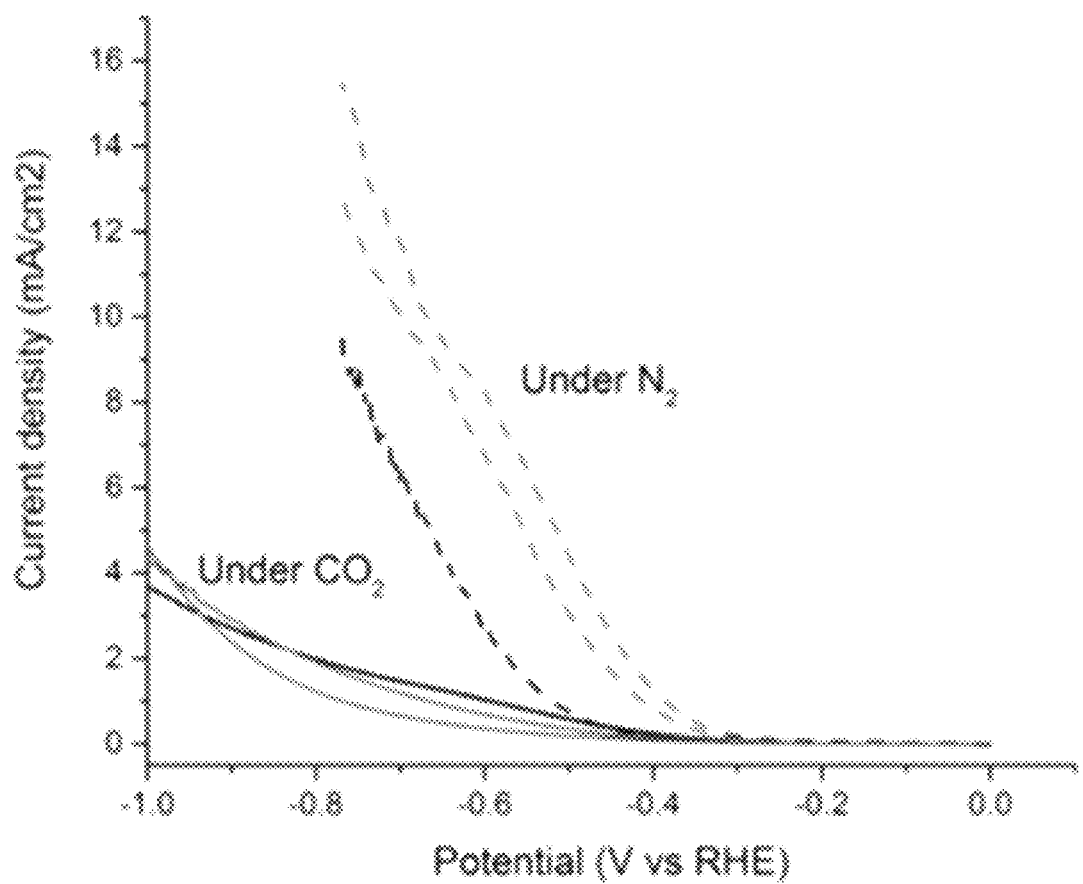
FIG. 5 shows the linear sweep voltammetry of three nickel phosphide electrodes according to the present invention ($Ni_{12}P_5$, $Ni_2P$ and $Ni_5P_4$), in 0.1 M $KHCO_3$ (pH 6.8) at 100 mV/s under $N_2$ and under $CO_2$.
Figure 6:
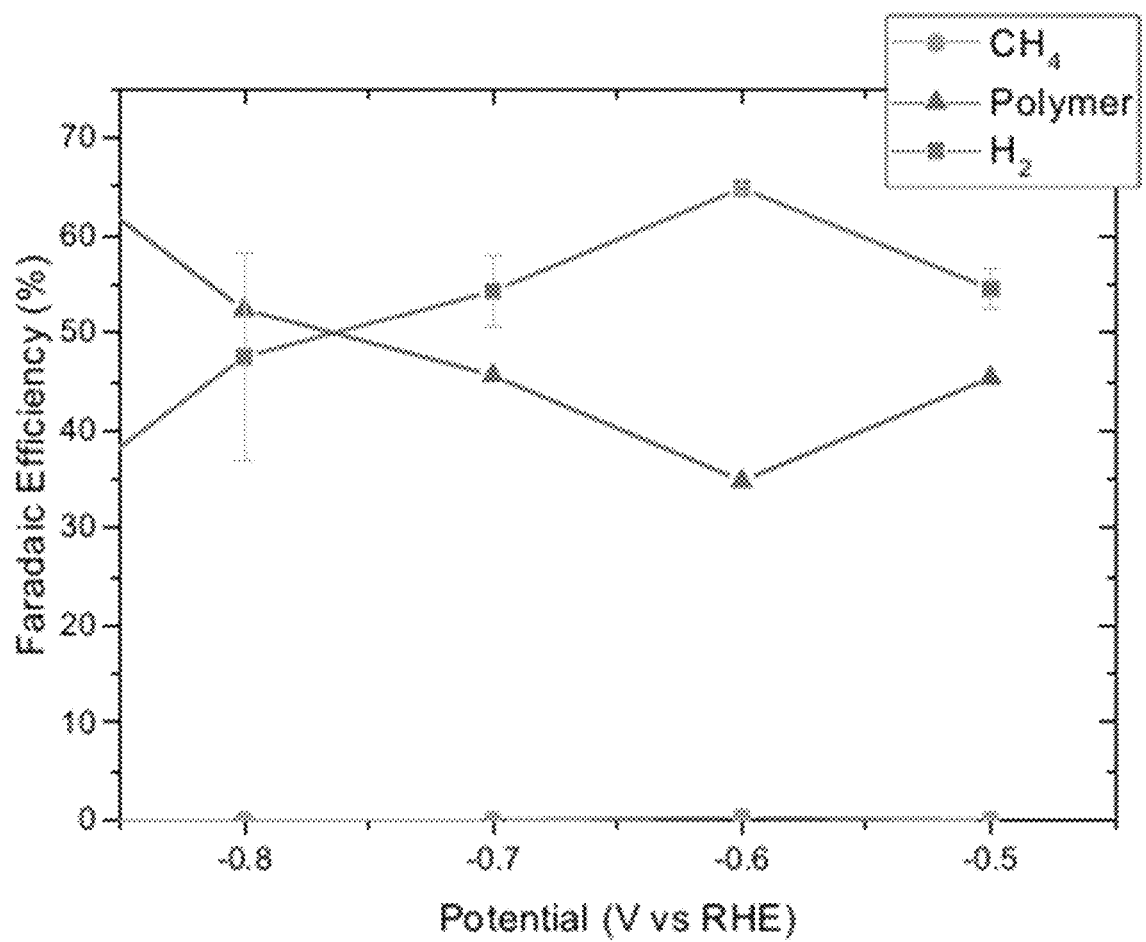
FIG. 6 shows that when scaled up to a flow electrolyzer with 4 $cm^2$ electrodes, a nickel phosphide electrocatalyst according to the present invention ($Ni_5P_4$) produces formaldehyde which is isolated as a polymer from water with the formula $HO[CH_2O]_mH$. The production of soluble hydrocarbons is significantly lower for this nickel phosphide electrocatalyst under these conditions.

Some data for nickel phosphides with different structures (Ni$_5$P$_4$, Ni$_2$P, Ni$_{12}$P$_5$) are shown in FIGS. 1, 2 and 3. FIG. 1 illustrates how Ni$_5$P$_4$ and Ni$_2$P, show a decreased HER current in the presence of CO$_2$ (CO$_3^{2-}$ electrolyte) even at a large driving force (−0.6 vs. RHE). In contrast, Ni$_{12}$P$_5$ shows little dependence of the HER current with CO$_2$ concentration. This indicates that, for this family of binary compounds, where only the crystalline phase changes (the same binary elements), there is a clear difference in how the surfaces bind $CO_2$ and how this inhibits the HER current. Further, FIG. 2 shows that $Ni_{12}P_5$ is more effective at producing $CH_4$ than either $Ni_5P_4$ or $Ni_2P$. Methane production indeed inversely correlates with $H_2$ production on these materials (FIG. 2). Hence, there is a strong structure dependence—and therefore a potential descriptor—for $CH_4$ production on these electrocatalysts.

All three electrocatalysts ($Ni_5P_4$, $Ni_2P$, $Ni_{12}P_5$) produced $CH_4$ at −0.7V vs. RHE in $CO_2$ saturated $CO_3^{2-}$ solution which is slightly less than the DFT predicted limit of −0.74V vs. RHE; therefore, it can be deduced that these binary compounds show a tendency towards breaking the scaling relationship, as described above. This was the first indicator that the Ni—P compound family is a viable way to further reduce the voltage driving force required for $CO_2$ reduction. Based on the results of $CO_2$ reduction in $CO_3^{2-}$ solution, this family of DCRR binary electrocatalysts showed a structurally correlated activity. Understanding this structure dependence allows for the rational design of new $CO_2$ reduction electrocatalysts.

$Ni_5P_4$, $Ni_2P$, and $Ni_{12}P_5$ also show no release of CO as a gaseous product, possibly due to its absence of formation or irreversible bonding on these surfaces. Furthermore, $Ni_5P_4$, $Ni_2P$, and $Ni_{12}P_5$ are the first examples of binary electrocatalyst compounds that break the scaling relation for DCRR.

In another co-catalyst strategy to improve activity further, the HER activity of the inventive binary electrocatalysts can be reduced in favor of the DCRR activity by incorporating polymers or ionomers, or ionic liquids with low $H^+$ conductivity but good $CO_2$ and $H_2O$ transport properties. These polymers or ionomers or ionic liquids can be directly mixed in with the electrocatalyst particles to offer a composite heterogeneous electrode.

Flow Systems

Herein, binary transition metal phosphide electrocatalyst compounds have been demonstrated to have surprising DCRR activity for hydrocarbons or oxygenated hydrocarbons. Upon switching to a flow reactor in which $CO_2$ is continuously passed over the working electrode, the carbon-containing products are formed at higher rates and in higher concentrations. This constitutes another aspect of the invention.

An aspect of the invention is directed to a combination of 1) a cathode for direct electrochemical reduction of carbon dioxide and carbon monoxide to oxygenated hydrocarbon products, the cathode including a conductive support substrate and an electrocatalyst coating, the electrocatalyst coating including nanoparticles of $Ni_xP_y$, where x and y represent integers such that the compounds are selected from $Ni_3P$, $Ni_5P_2$, $Ni_{12}P_5$, $Ni_2P$, $Ni_5P_4$, $NiP_2$, and $NiP_3$; or the electrocatalyst coating including nanoparticles of $Ni_xP_y$ is selected from $Ni_3P$, $Ni_5P_2$, $Ni_{12}P_5$, $Ni_2P$, $Ni_5P_4$, $NiP_2$, and $NiP_3$, and further alloyed with $Fe_2P$, where the alloy has a Ni—P:$Fe_2P$ ratio between about 99:1 and 1:99 wt %; where the conductive support substrate includes hydrophobic regions and hydrophilic regions to aid in adsorption of carbon dioxide and/or carbon monoxide from gas or aqueous phase to achieve separation from water molecules, where at least some of the electrocatalyst nanoparticles are located in the hydrophobic regions of the conductive support substrate and catalytically interact with the carbon dioxide and/or carbon monoxide by electrical reduction to produce oxygenated hydrocarbon products; and 2) a co-catalyst for the reduction of carbon dioxide and/or carbon monoxide, other than a nickel phosphide, positioned to act together with the electrocatalyst. The Ni—P:$Fe_2P$ ratio can be between about 99:1 to about 1:99 wt %. The Ni—P:$Fe_2P$ ratio can be between about 95:5 to about 5:95 wt %. The Ni—P:$Fe_2P$ ratio can be between about 90:10 to about 10:90 wt %. The Ni—P:$Fe_2P$ ratio can be between about 25:75 to about 75:25 wt %.

The co-catalyst can comprise an acid; the acid can be selected from a Lewis acid or a Bronsted-Lowry acid. The acid can be selected from the group consisting of $Zn^{+2}$, $Fe^{+2}$, $Fe^{3+}$, $Ca^{2+}$, $Mg^{2+}$, $Al^{+3}$, $AlO^+$, $Si^{4+}$, $SiO^{2+}$, $H_3BO_3$, $H_xBO_yR_z$ (where x, y, and z are each independently 0 or an integer selected from 1 to 3, wherein $-(x+(-2y)+(z \cdot n))=-5$ or −1 or 0 or 1 or 2 or 3, where n is −1, −2, or −3 for various substitutions on R). so that boric acid esters include, for example, $B(OH)_2(OR)$ and $B(OH)(OR)_2$, where R=alkyl, aryl, arylalkyl, heteroaryl, heteroarylalkyl, where the heteroatoms of heteroayl and hetarylalkyl are selected from nitrogen, oxygen and sulfur), and mixtures of two or more thereof. Suitable R=alkyl groups include, without limitation, methyl, ethyl, n-propyl, iso-propyl, n-butyl, sec-butyl, iso-butyl, tert-butyl, n-pentyl, iso-pentyl, sec-pentyl, tert-pentyl, neopentyl. Suitable R=aryl groups include, without limitation, phenyl, biphenyl and naphthyl, optionally substituted with one or more of halogen, alkoxy, alkylthio, alkyl, cyano, nitro, alkylsulfoxide, alkylsulfone, arylsulfone.

The co-catalyst can comprise a boron compound of the formula $H_xBO_yR_z$ having an oxidation state of −5, −1, 0, +1, +2, or +3, so that the integers x, y and z are defined by the equation $-(x+(-2y)+(z \cdot n))=-5$ or −1 or 0 or 1 or 2 or 3; where n is −1, −2, or −3 for various substitutions on R, with R defined as above. In addition to the boric acid esters $B(OH)_2(OR)$ and $B(OH)(OR)_2$, where R=$CH_3$, alkyl, $C_6H_5$, aryl, etc., this also includes $(C_6H_5)_3B$ (triphenyl borane) and $H_3NBH_3$ when x or y is 0, and $H_3BO_3$ (boric acid) and $BH_3$ when z is 0.

The co-catalyst can comprise a base; the base can be selected from a Lewis base or a Bronsted-Lowry base. The base can be selected from $NH_3$, carbamide, urea, hydrazine, primary amines, secondary amines, tertiary amines, pyridines, and mixtures of two or more thereof.

The cathode can be in contact with an electrolyte solution containing the co-catalyst or the co-catalyst can be an ionic liquid electrolyte that possesses $HCO_3^-$ or $CO_3^{2-}$ or $H^+$ transport functionality and is in contact with the cathode. Alternatively, the co-catalyst can be an ionomer or a conducting polymer.

Further, the co-catalyst can include a soluble salt of Cu, Ag, Au, Zn, mixtures of two or more thereof, or salts or oxides thereof. The salts or oxides become soluble at an appropriate pH. Alternatively, the co-catalyst can include a simple metal or alloy selected from Cu, Ag, Au, Zn, and intermetallic compounds thereof. The co-catalytic metal or intermetallic compounds can be in the form of nanoparticles. The co-catalytic metal, inter-metallic or oxide nanoparticles range in size from about 0.1 to about 1000 nm. The co-catalyst particle size can be about 0.5 nm to about 1000 nm, or about 0.5 nm to about 500 nm, or about 0.5 nm to about 50 nm, or about 0.5 nm to about 20 nm. The co-catalyst particle size can be about 0.1 nm to about 500 nm, or about 0.1 nm to about 50 nm, or about 0.1 nm to about 5 nm, or about 0.1 nm to about 2 nm.

Without wishing to be bound by any particular theory, it is believed that the co-catalyst of the above combination binds to a reaction intermediate on the electrocatalyst surface and 1) influences the intermediate's binding orientation, and/or 2) activates the intermediate for subsequent reaction with surface-bound hydrides or other $CO_2/CO$ reaction intermediates, and/or 3) influences the intermediate's binding strength to become stronger or weaker, and/or 4) facilitates the formation of new reaction intermediates on the surface.

The cathode can be in contact with the electrolyte solution comprising the co-catalyst with the conductive support further comprising the same co-catalyst. The conductive support substrate can further incorporate a material to be reduced, whereby the electrocatalyst coating catalytically interacts with the material to be reduced which is incorporated into the conductive support substrate. Preferably the material to be reduced comprises carbon dioxide, carbon monoxide, or a mixture thereof. Alternatively, the conductive support substrate can be an ionomer or a conducting polymer.

Another aspect of the invention is directed to a method for generating oxygenated hydrocarbon products from water, carbon dioxide and/or carbon monoxide via an electrolysis reaction, performed by: (a) placing the combination of the electrocatalyst-coated cathode and a co-catalyst in an electrolyte together with an anode; (b) placing the anode and cathode in conductive contact with an external source of electric current; (c) providing a carbon source of carbon dioxide and/or carbon monoxide to the cathode; and (d) applying the electric current to drive an electrolysis reaction at the cathode, whereby oxygenated hydrocarbon products are generated selectively from the carbon dioxide and/or carbon monoxide. In the method, the electrocatalyst and co-catalyst are selected to generate a product selected from 2,3-furandiol, 2-formylfuran-3-ol, ethylene glycol, 1,3-propanediol, 1,2-propanediol, stereo-isomers thereof, and combinations thereof.

Preferably the source of carbon dioxide and/or carbon monoxide is a flowing source. The flowing source can be a flow reactor.

A further aspect of the invention is directed to a method for reduction of carbon dioxide to oxygenated hydrocarbon products performed by (a) placing a cathode in an aqueous electrolyte together with an anode and a co-catalyst of an acid or a base or a charged ionic species, where the cathode includes a conductive support substrate, a co-catalyst including an acid or a base or a charged ionic species, and an electrocatalyst coating of nanoparticles of $Ni_xP_y$ where x and y represent integers such that the compounds are selected from $Ni_3P$, $Ni_5P_2$, $Ni_{12}P_5$, $Ni_2P$, $Ni_5P_4$, $NiP_2$, and $NiP_3$, where the co-catalyst can be on the conductive support, in the electrolyte, or both; (b) placing the anode and cathode in conductive contact with an external source of electric current; (c) providing a flowing source of carbon dioxide to the cathode; and (d) applying the electric current to drive an electrolysis reaction that generates electrons at the anode that are delivered to the cathode, whereby oxygenated hydrocarbon product is generated from the carbon dioxide, electrons and water, and the electrocatalyst and co-catalyst are selected so that the oxygenated hydrocarbon product that is generated is selected from carbohydrates, carboxylic acids, aldehydes, ketones and mixtures of two or more thereof.

Yet another aspect of the invention is directed to a method for reducing carbon dioxide to oxygenated hydrocarbon products, performed by: (a) placing a cathode in an electrolyte together with an anode and a co-catalyst, where the cathode includes a conductive support substrate and an electrocatalyst coating, the electrocatalyst coating includes nanoparticles of $Ni_xP_y$ where x and y are integers such that the compounds are selected from $Ni_3P$, $Ni_5P_2$, $Ni_{12}P_5$, $Ni_2P$, $Ni_5P_4$, $NiP_2$, and $NiP_3$, where the co-catalyst can be on the conductive support, in the electrolyte, or both; where the co-catalyst binds to an aldehyde, ketone or alcoholic functional group of a reaction intermediate, thereby activating it for further reaction with the electrocatalyst; (b) placing the anode and cathode in conductive contact with an external source of electric current; (c) providing a flowing source of carbon dioxide to the cathode; and (d) applying the electric current to drive an electrolysis reaction to generates electrons at the anode that are delivered to the cathode, where oxygenated hydrocarbon product is generated from the carbon dioxide, and the electrocatalyst and co-catalyst are selected so that the oxygenated hydrocarbon product that is generated is selected from carbohydrates, carboxylic acids, aldehydes, ketones and mixtures of two or more thereof. The co-catalyst can be a metal selected from Cu, Ag, Au, Zn, and inter-metallic compounds thereof. The co-catalytic metal or intermetallic compounds can be nanoparticles.

The electrocatalysts in the examples below were synthesized and characterized by physical characterization methods to ascertain their atomic structure and their HER activity is tested electrochemically and by gas chromatography. The inventive electrocatalysts can be supported on a titanium film electrode, for example, by being pressed into a pellet and bonded to a titanium film electrode via silver paint and sealed in a non-conducting epoxy. Alternatively, the electrocatalysts can be supported on carbon or ceramic powder.

The as-synthesized electrocatalysts of this disclosure have grain sizes in the range from about 5 nm to about 5000 nm, preferably from about 5 nm to about 1000 nm, more preferably from about 5 nm to about 500 nm, and even more preferably from about 5 nm to about 20 nm. The grain sizes can range from about 10 to about 4000 nm, or from about 25 to about 3000 nm, or from about 50 to about 2500 nm. The particle size can be at least 100 nm. These grains are part of larger 0.3-1.8 mm spherical particle agglomerates. The durability of the electrocatalyst under electrolysis conditions in both 1M $H_2SO_4$ acid and 1M NaOH, was found to be very good. Evidence comes from both electrochemical stability and X-ray fluorescence confirming atomic composition of the surface, and from physical appearance at the macroscale.

Support Substrates

According to another aspect of the invention the electrocatalyst comprises a catalytic group and a conductive support substrate supporting a plurality of the catalytic groups. The support substrate can be capable of incorporatisng hydrogen cations, and at least some of the catalytic groups supported by the support substrate are able to catalytically interact with the hydrogen cations incorporated into the support substrate. The support substrate can be capable of incorporating water molecules, and at least some of the catalytic groups supported by the support substrate are able to catalytically interact with water molecules incorporated into the support substrate. The support substrate can be capable of incorporating carbon dioxide, and at least some of the catalytic groups supported by the support substrate are able to catalytically interact with $CO_2$ molecules incorporated into the support substrate.

The support substrate has a plurality of porous regions that are microporous, mesoporous, and/or macroporous. The support substrate can be a microporous substrate having an average pore size of less than about 2 nm. The support substrate can be a mesoporous substrate having an average pore size of from about 2 to about 50. The support substrate can be a macroporous substrate having an average particle size of greater than about 50 nm.

The support substrate is conductive to electrons so that when an electric potential difference is present across separate points on the support substrate, the mobile charges within the support substrate are forced to move, and an electric current is generated between those points. The support substrate can be rendered conductive by applying a thin layer of the support substrate onto a conductive material. Suitable conductive materials include glassy carbon, carbon nanotubes and nanospheres, fluoride doped tin oxide (FTO or ((F)$SnO_2$)) coated glass and indium tin oxide (ITO) (or any of the transparent conductive oxides) coated glass, and multilayer structures having nano-structured semiconductor films coated onto the conductive substrates. Other means of causing the support substrate to be conductive are within the scope of the invention. For example, the support substrate can contact a sensitized semiconductor.

Preferably, the support substrate has hydrophobic regions and hydrophilic regions, and contributes co-catalyst function. With regard to the reduction of water or $CO_2$, while not wishing to be limited by theory, it is thought that at least some of the catalytic groups can be supported in the hydrophobic regions of the support substrate and once supported are able to catalytically interact with water or $CO_2$ molecules in the hydrophilic regions. Effectively, the support substrate is thought to act as an interface between hydrogen cations, water molecules or $CO_2$ molecules and the catalytic groups that are otherwise insoluble in aqueous solution.

The hydrophobic regions can be formed by a hydrophobic polymeric backbone and the hydrophilic regions are regions of ionizable functional groups, preferably on the polymer backbone that can serve as sites for proton conductance. Preferably the ionizable functional groups are sulfonate groups (—$SO_3H$) that lose a proton to form negatively charged sulfonate groups. Alternatively, the ionizable functional groups can form positively charged functional groups that can serve as sites for hydroxide or carbonate ion conductance, if preferred.

The support substrate can be, for example, polysulfones, polysulfonates, and poly-phosphonates. The supports substrate can comprise a sulfonated fluoro-polymer (sold under the trade mark of NAFION®). The hydrophobic $CF_2CF$ ($CF_3$)O— polymer backbone of NAFION® forms a hydrophobic solid that is penetrated by aqueous channels lined with the hydrophilic ionizable sulfonic acid groups. Investigations into the sub-structure of NAFION® coatings on solid surfaces have revealed that the polymer layers contain these hydrophilic channels throughout the otherwise hydrophobic regions of the membrane. These channels allow the diffusion of small molecules such as water.

Other support substrates that can be used include, for example, perfluorinated sulfonic acid polymer cation-exchange membranes such as F-14100, F-930 and F-950, the GEFC perfluorinated proton exchange membranes, polysulfone ionomers, nanostructured films formed by metal oxide nanoparticles suitably decorated with organic acids including perfluorinated sulfonic acids, nanostructured films formed by the hydrolysis of alkoxysilanes suitably decorated with organic acids including perfluorinated sulfonic acids.

Other supporting substrates can be, for example, polyfluorinated alkaline exchange membranes (AEM) that rely upon fixed cationic functional groups within the polymer to prevent the conduction of protons and allow conduction of mobile anions for conductivity. Examples of commercial AEMs include TOKUYAMA® AEM. Also within the scope are heterogeneous-homogeneous colloidal systems, two-phase (bi-phasic) mixtures (stabilized and unstabilized with surfactant), conducting polymers (e.g., poly(3,4-ethylenedioxythiophene) (PEDOT)), surface-modified silica and titania.

Other support substrates that can be used to contribute co-catalyst functionality include borate/boronic acid- or amine/ammonium-functionalized polymers with an alkyl or aryl or polyfluorinated polymer backbone.

Any means of contacting the electrocatalyst with water, $CO_2$ or carbonate mineral is within the scope of the invention. The electrocatalyst can be immersed in a solution containing water molecules. The solution can be an aqueous solution containing electrolyte. The aqueous solution can be a solution from which water is preferentially removed (i.e. solid liquid separation). For example when the aqueous solution is salt water or sea water the water could be removed leaving the salt behind (i.e., desalination). In one example, about 0.1M electrolyte is sufficient.

The following examples are provided to further illustrate the methods and compositions of the present invention. These examples are illustrative only and are not intended to limit the scope of the invention in any way.

EXAMPLES

Example 1. Electrode Fabrication 100 mg of electrocatalyst powder was suspended in 250 µL of 5% NAFION® suspension previously neutralized with NaOH. The electrocatalyst powder was continuously mixed with the NAFION® suspension by mortar and pestle until dried. To fully dry these they were further dried under vacuum for several hours.

50 mg of the resulting electrocatalyst/polymer composite was pressed under 5 tons of pressure in a 6 mm diameter die. The resulting pellet was cut in half and each half mounted on a Ti plate (Sigma-Aldrich) with a drop of Ag-paint (SPI supplies). The Ti plate was previously fixed to a copper wire with Ag-paint. The copper wire assembly was threaded through a glass tube. After drying, the Ag-paint, the sides of the electrocatalyst pellet, and Ti plate was isolated from solution by covering in Hysol™ T1 epoxy (Logitech) all the way up onto the glass tube. The geometric surface area was determined by imaging the exposed surface and measuring it using the ImageJ™ software.

Example 2. Electrochemical Measurement

All solutions were prepared using MILLIPORE® water. Electrochemical cells were cleaned using piranha solution (1:3 35% $H_2O_2$ and concentrated $H_2SO_4$) followed by thorough rinsing in MILLIPORE® water. A three electrode setup with a NAFION® membrane or anion-exchange membrane separator of working and counter compartment was used for all the electrochemical measurements. To avoid the possibility of Pt contamination a B-doped diamond electrode was used as a counter electrode during stability measurements. A homemade Hg/$HgSO_4$ (Sat'd KCl) reference electrode was used and calibrated against a commercial Saturated Calomel electrode (Hack) at open circuit potential prior to each measurement. Chronoamperiometric data was not uncompensated IR-drop, as only small currents on the order of hundreds of micro-amperes were drawn, effectively removing this source of error.

Electrolytes were prepared from MILLIPORE® water using high purity grade reagents. Furthermore, as a further precaution to remove potential metal impurities solutions were filtered through K+-CHELEX® 100 matrix. Electrolytes were stored in Piranha-cleaned flasks until used. Just prior to measurements the electrolytes were saturated with $CO_2$ (Airgas CD1200) cleaned using a Supelco hydrocarbon trap (Sigma) to <6 ppm $CH_4$ (the major hydrocarbon impurity).

Product analyses were conducted on a HP5890 Series II GC with a 5 A MSieve (Restek) 0.53 mm capillary column using Ar carrier gas (cleaned for hydrocarbons and moisture on a Supelco Hydrocarbon, moisture trap). Calibrations were performed using certified mixed gasses i.e. 1.04% $CH_4$/Ar from Airgas, 1.02% $H_2$/Ar, and pure $C_2H_4$ likewise from Airgas.

Catalyst Fabrication: Solid State Synthesis 1.5 mol % stoichiometric excess of red phosphorous (Alfa-Aesar 99%) and stoichiometric amounts of nickel (Sigma-Aldrich <150 μm) were thoroughly mixed in a mortar. Transferred to a quartz tube evacuated and sealed after cleaning with Ar by back filling 2-3 times. The evacuated tubes were placed in a furnace and ramped to 700° C. and kept there for 24 hours. Ramp rates were modest to avoid excessive heating upon reaction. Temperatures were ramped from 80° C. to 250° C. over 580 min with a 360 min dwell time, then to 350° C. over 300 min with a 200 min dwell time, then to 450° C. over 300 min with a 200 min dwell time, and finally to 700° C. over 350 min with a 24 hour dwell time. Samples were then cooled to room temperature under ambient conditions. Sample purity was checked by powder X-ray diffraction (PXRD) and additional Ni or P was added if necessary, mixed and sealed as above, and reheated using an accelerated sequence (580 min from 80° C. to 750° C. with a 24 hour dwell time).

This method produced micron sized particles which were then melted at 1200° C. in evacuated quartz tubes and recrystallized by slow cooling to 900° C. Any phosphorous that was lost during this procedure could be diffused into the resulting rods by heating to 700-900° C. for 24 hours, yielding phase pure slugs of $Ni_xP_y$ that could be machined into flat electrodes with a well-characterized surface area.

Nanoparticulate nickel phosphides were prepared starting from 20 nm Ni nanoparticles (99.9% USNano Ltd.) which were lightly mixed with 101.5 mol % red P in a glovebox under Ar. The sample was sealed in an evacuated quartz tube and heated slowly to 450° C. with a dwell time of 48 hours. The ramp was 80° C. to 175° C. in 580 min, followed by dwell for 360 min, ramp to 250° C. in 580 min, followed by dwell time of 360 min, then ramped to 350° C. in 360 min, followed by dwell time 300 min, and then finally to 450° C. in 360 min, followed by 48 hours dwell time. The sample cooled to room temperature under ambient conditions, and phase purity was checked by PXRD. Additional P could then be added in air analogous to the solid-state reaction in 1). Ramp rates for additional P addition were 580 min from 80° C. to 450° C. and dwell time of 48 hours. Occasionally, small impurities of $Ni(PO_3)_2$ were formed during air exposure and this phase was removed by acid washing in diluted HCl (~1:10 conc. HCl to water by volume).

Crystal phase characterization was done on a Bruker AXS D8 Advance x-ray diffractometer with Cu Kα1 radiation (1.54056 Å), a scan time of 1 hr or 12 hr, and a 2θ range of 15-70° or 10-120°. Samples were analyzed prior to electrochemical testing by dispersing the powder between two glass microscope slides.

Example 3. $Ni_3P$ Electrocatalyst Synthesis

The electrocatalysts were synthesized using the solid state method. In a typical experiment 5 g Ni metal (Sigma-Aldrich 99.99%, <150 μm) was mixed thoroughly with 2.141 g red phosphorous (Alfa-Aesar, 98.9%, 325 mesh) using a mortar and pestle for 20 min. The mixture was loaded into a quartz tube and evacuated to a base pressure of ca. $2·10^{-3}$ mtorr. The tube was backfilled with high purity argon and evacuated 3 times prior to sealing. The tube was then heated in a box furnace to 700° C. for 24 hr. A slow ramp cycle was used during heating to avoid local hotspots in the mixture during reaction. The ramp was 580 min to 350° C. then hold for 300 min., then ramped to 450° C. for 200 min followed by 300 min hold, then ramped to 550° C. for 200 min and hold for 300 min, followed by a 300 min ramp to 700° C. hold for 24 hr and cool to RT in 90 min. After recovery the sample was crushed and checked by PXRD. If minor impurities were seen, additional Ni or P was added and the sample sealed in a quartz tube as above. The sample was then heated to 700° C. for 24 hr again.

Example 4. Characterization of $Ni_3P$ Nanoparticles

PXRD analysis was performed on a Bruker AXS D8 Advance using a Cu Kα X-ray tube (1.546 Å), a scan time of 1 hour or 12 hours and a 2θ range of 15-70° or 10-120°. Samples were analyzed prior to electrochemical testing by dispersing the powder on a glass microscope slide and flattening the powder surface using another glass slide. Electrodes analyzed after electrochemical tests were measured by gently cutting Ti-foil free from the Pyrex tube and removing the Cu-wire. The pellet and Ti-foil was placed on a glass slide and the PXRD pattern recorded.

High-resolution transmission electron microscopy (HR-TEM) analysis was performed at 200 keV, vacuum pressure of about $2 \times 10^{-7}$ Torr, and operated using the standard imaging and diffraction mode. Powder samples from the electrodes were placed on an Au mesh TEM grid (300 mesh, 3 mm in diameter) that was previously covered by a thin carbon layer (support film). These samples were also analyzed using scanning electron microscopy (SEM) operated at 15 kV and 5 kV accelerating voltage, 140 pA probe current, 2000 cps as average count rate on the whole spectrum, and a counting time of 60 second.

Electrodes were run for 6 hours prior to analysis in either 1M NaOH or 1M $H_2SO_4$ under continuous $H_2$ bubbling. Then quickly removed from the cell and rinsed in copious amounts of Nanopure water followed by light rinsing in ethanol and dried at room temperature. The solution exposed nanoparticles were removed by scratching the surface of the electrode lightly in a drop of high purity acetone. The acetone was then removed and dropped onto a lacey carbon film on an Au-grid. After drying the samples was examined in the microscope.

Catalyst Fabrication: Hydrothermal or Solvothermal Methods

Nanoparticles were also successfully prepared by hydrothermal or solvothermal methods as described in literature:
Henkes, A. E., and Schaak, R. E. (2007). Trioctylphosphine: A general phosphorus source for the low-temperature conversion of metals into metal phosphides. *Chemistry of Materials*, 19(17), 4234-4242. doi:10.1021/cm071021w
Laursen, A. B., Patraju, K. R., Whitaker, M. J., Retuerto, M., Sarkar, T., Yao, N., . . . Dismukes, G. C. (2015). Nanocrystalline $Ni_5P_4$: a hydrogen evolution electrocatalyst of exceptional efficiency in both alkaline and acidic media. *Energy Environ. Sci.*, 8(3), 1027-1034. doi:10.1039/C4EE02940B Muthuswamy, E., Savithra, G. H. L., and Brock, S. L. (2011). Synthetic Levers Enabling Independent Control of Phase, Size, and Morphology in Nickel Phosphide Nanoparticles. *ACS Nano*, 5(3), 2402-2411. doi:10.1021/nn1033357

Prins, R., and Bussell, M. E. (2012). Metal Phosphides: Preparation, Characterization and Catalytic Reactivity. *Catalysis Letters*, 142(12), 1413-1436. doi:10.1007/s10562-012-0929-7

Example 5. Synthesis of $Ni_5P_4$ Nanoparticles Using Solvothermal Method

Using the solvothermal synthesis route disclosed previously (see PCT/US2013/078486), $Ni_5P_4$ was synthesized as phase pure nanoparticles ($Ni_5P_4$ NPs). About 0.385 g Ni(acetylacetonate, acac)$_2$.xH$_2$O (Sigma-Aldrich) was placed in a 3-necked flask together with about 2.5 g tri-n-octylphosphine oxide, TOPO (Strem Chemicals). The flask was connected to a condenser in one port, a Schlenk line in the other, and corked in the third. The condenser was connected to a silicone oil bubbler venting into a fumehood.

The flask was degassed under vacuum and then refilled with high purity argon (Air-liquid). A flow of Ar was established through the flask before adding 10 ml of tri-n-octylphosphine, (TOP; Strem Chemicals) under an argon (Ar) blanket. The solution was left under Ar flow for approximately 20 minutes to remove any oxygen. The Ar flow was adjusted to a slow rate 1 bubble per second and the flask was then placed on a pre-heated sand bath at 390° C. for 1.5 hours. The TOPO quickly melted completely and the solution started refluxing and producing white smoke, thereafter turning brown then black. The flask was buried so that the thermoprobe of the temperature controller of the sand bath was level with the top of the reactant liquid and the sand surface was approximately 1 cm above the liquid level.

After reaction for 1.5 hours the flask was removed from the heat and cooled to room temperature. The black solution was transferred to a centrifuge tube with hexanes and diluted 4:10:1 by volume with 96% ethanol and acetic acid (98% Sigma-Aldrich). After centrifugation a gray powder was recovered. The powder was suspended in hexanes by sonication and washed with addition of ethanol and acetic acid, repeated twice. The powder was washed three times in acetone by centrifugation and decantation followed by one cleaning in ethanol. The recovered powder was dried under vacuum.

Example 6. Synthesis

Sintered disks of single-phase, crystalline metal phosphides were synthesized using a traditional solid state synthesis. Briefly, metal powder and red phosphorous in stoichiometric amounts plus 1 wt % excess phosphorous were ground with an agate mortar and pestle. The mixtures were sealed in evacuated quartz tubes and heated according to the following ramp:

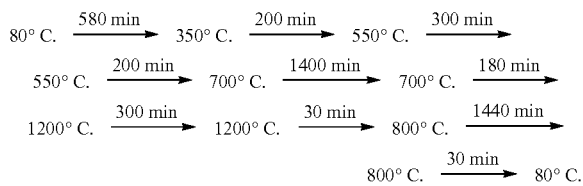

The resulting product was analyzed using PXRD and, if any of the crystalline phases impurity was present, the composition was adjusted to the right stoichiometry and the heating procedure repeated until the desired phase was pure. The resulting material was mounted as an electrode with a contact encapsulated in chemical-resistant epoxy.

Example 7. Electrochemistry

The electrochemical measurements were performed in a 4-neck flask with rubber seals. The catholyte (5 mL) was separated by a SELEMION® anion exchange membrane from the anolyte compartment (1 mL). Electrodes were prepared with the transition metal phosphides using a back contact of silver epoxy and copper wire, enclosed in glass and sealed with epoxy (Hysol™ 1C). The potential of the cathode was measured with respect to a homemade Hg/Hg$_2$SO$_4$/K$_2$SO$_4$ saturated reference electrode, calibrated daily against an ACCUMET® standard calomel electrode. Platinum mesh was used as the counter electrode. The electrolyte solution, 0.1M KHCO$_3$, was prepared with MIL-LIPORE® water and reagent grade chemicals, was purified by treatment with CHELEX® 100 (potassium form) resin to remove trace divalent cations known to interfere with CO$_2$ reduction.

Cyclic voltammetry experiments were conducted using a CH Instruments potentiostat. The electrodes were pre-conditioned for 10 min at −0.5 V. For measurements conducted under a N$_2$ flow, the pH of the electrolyte was adjusted to 6.8 with 0.5 M H$_2$SO$_4$.

The current efficiency measurements were conducted after purging the electrochemical cell and electrolyte for 60 min with 4.0 grade CO$_2$ further purified with a hydrocarbon trap (Supelpure HC). The flow of CO$_2$ during electrolysis was 10 sccm, measured with a gas flow meter. A constant potential was applied for 2 hours under magnetic stirring. The GC auto-sampler injected a 500 μL sample from the headspace every 25 minutes. The current efficiency (CE) was then calculated using the equation:

$$CE = \frac{nFe}{Q}$$

where n is the number of moles of a given product, F is Faraday's constant, e is the number of electrons necessary to generate one molecule of product (2 for H$_2$, 8 for CH$_4$, 12 for C$_2$H$_4$) and Q is the charge (current×time).

Example 8. Gas Chromatography

An HP 5890 Series II gas chromatograph equipped with a TCD and a FID detectors arranged in series and a 30 m megabore molecular sieve 5 A column (Restek) was employed for quantifying gaseous products. The GC was calibrated with gas standards and the number of moles of the products in the headspace of the cell determined by the ideal gas law.

Example 9. Reaction in the Presence of Co-Catalyst

Ni$_2$P was prepared by solid state synthesis and pressed into a pellet as described in Calvinho, K. U. D., Laursen, A. B., Yap, K. M. K., Goetjen, T. A., Hwang, S., Mejia-Sosa, B., Lubarski, A., Teeluck, K. M., Murali, N., Hall, E. S., Garfunkel, E., Greenblatt, M., and Dismukes, G. C. "Selective $CO_2$ Reduction to $C_3$ and $C_4$ Oxyhydrocarbons on Nickel Phosphides at Overpotentials as Low as 10 mV" *Energy & Environmental Science*, 2018, 11, 2550-2559.

The $Ni_2P$ pellet was tested under constant applied potential in $CO_2$-saturated electrolyte (a solution containing 0.5 M $KHCO_3$ and co-catalyst (25 mM hexamethylene tetraamine, 25 mM boric acid, or 1.5 mM $Mg^{2+}$). The tests were conducted at ambient pressure and temperature, at pH 7.5, for 16 h per experiment. The composition of the headspace was monitored by gas chromatography, and the liquid product was analyzed by HPLC and NMR according to methods described in Calvinho et al, *Energy & Environmental Science*, 2018, 11, 2550-2559. FIG. 9A shows NMR of the electrolyte, where the major peak is ethylene glycol, confirming the shift in selectivity caused by the addition of co-catalyst. This result is corroborated by HPLC using a refractive index detector showing boric acid and ethylene glycol as the major peaks (FIG. 9B).

Deposition of a metal or metal cation co-catalyst on nickel phosphide also alters the selectivity of the reaction by changing the populations and binding affinities of reaction intermediates on the surface. The $^1H$ NMR spectrum in FIG. 10 shows the $CO_2$ reduction products formed upon electrodeposition of copper metal or soluble Cu salts on $Ni_2P$ nanoparticles at 0V vs RHE and acidic pH. The data demonstrate the formation of two $C_5$ compounds (3-hydroxy-2-furancarboxaldehyde and 2-hydroxy-3-furancarboxaldehyde).

NASA's Carbon Dioxide Conversion Challenge

The $CO_2$ Conversion Challenge is a $1 million competition funded by NASA to convert carbon dioxide into sugars such as glucose, as a step toward creating mission-critical resources, particularly for future Mars missions. Such technologies will allow the manufacture of products using local, indigenous resources on Mars, as well as being applicable to Earth, by using waste and atmospheric carbon dioxide as a resource.

On Earth, plants convert $CO_2$ into carbohydrates and oxygen, supplying food and breathable air. There are no plants on Mars, but there is abundant $CO_2$. When astronauts begin exploring Mars, they will need to use local resources, freeing up launch cargo space for other mission-critical supplies. Thus, NASA is seeking novel ways to convert $CO_2$ into useful compounds, such as sugars, which will be key to providing supplies for human explorers on long-term missions on Mars.

Phase 2 of NASA's $CO_2$ Conversion Challenge has just been initiated, with the goal of building a system that demonstrates the conversion of $CO_2$ in combination with hydrogen, and without the use of plants, to produce simple sugars such as glucose. The selective, efficient co-catalyst technology described herein provides one solution that fulfills the requirements of the $CO_2$ Conversion Challenge.

INDUSTRIAL APPLICATION

Electrocatalysts for the direct $CO_2$ reduction to hydrocarbons may be realized through flow electrolyzers of similar types to the chlor-alkali producing cells currently used on an industrial scale. $CO_2$ sources could be point sources such as power stations, cement plants, or similar large $CO_2$ emitting industries or from extraction directly from the atmosphere. The $Ni_xP_y$ phase would be applied as nanoparticles or microparticles (5-5000 nm) on a conductive substrate electrode. The particles may be affixed using one or more polymers with or without chemical binding groups for coordination of protons or $CO_2$. This polymer may be of the same type as the supporting membrane conducting ions from the anode to cathode. Electrolysis may be performed around neutral pH using carbonate, phosphate, KCl, or sulfate electrolytes.

The inventive $Ni_xP_y$ electrocatalysts have the potential to be a direct alternative to fossil raw materials (crude oil, coal, and natural gas) as a source for chemical feedstocks and energy storage. Carbon neutral synthetic fuels resulting from this technology will not need the expensive and environmentally impactful fossil fuel supply chain (mining/drilling, pipelines/tankers, refineries). Fuel could be made on demand and at strategic locations near hubs. Carbon chemical feedstocks could be tailor-made and would not be the result of the inefficient processing of raw fossil materials.

Without further elaboration, it is believed that one skilled in the art, using the preceding description, can utilize the present invention to its fullest extent. Furthermore, while the present invention has been described with respect to aforementioned specific embodiments and examples, it should be appreciated that other embodiments utilizing the concept of the present invention are possible, and within the skill of one in the art, without departing from the scope of the invention. The preceding preferred specific embodiments are, therefore, to be construed as merely illustrative, and not limitative of the disclosure in any way whatsoever.

What is claimed is:

1. In combination:
   a cathode for direct electrochemical reduction of carbon dioxide and carbon monoxide to oxygenated hydrocarbon products, the cathode comprising a conductive support substrate and an electrocatalyst coating, the electrocatalyst coating comprising nanoparticles of $Ni_xP_y$, wherein x and y represent integers such that the compounds are selected from the group consisting of $Ni_3P$, $Ni_5P_2$, $Ni_{12}P_5$, $Ni_2P$, $Ni_5P_4$, $NiP_2$, and $NiP_3$; or the electrocatalyst coating comprising nano-particles of $Ni_xP_y$ is selected from the group consisting of $Ni_3P$, $Ni_5P_2$, $Ni_{12}P_5$, $Ni_2P$, $Ni_5P_4$, $NiP_2$, and $NiP_3$, further alloyed with $Fe_2P$, wherein the alloy has a $Ni-P:Fe_2P$ ratio between about 99:1 and 1:99 wt %;
   wherein the conductive support substrate comprises hydrophobic regions and hydrophilic regions to aid in adsorption of carbon dioxide and/or carbon monoxide from gas or aqueous phase to achieve separation from water molecules, wherein at least some of the electrocatalyst nanoparticles are in the hydrophobic regions of the conductive support substrate and catalytically interact with the carbon dioxide and/or carbon monoxide by electrical reduction to produce oxygenated hydrocarbon products; and
   a co-catalyst for the reduction of carbon dioxide and/or carbon monoxide, other than a nickel phosphide, positioned to act together with the electrocatalyst.

2. The combination of claim 1, wherein the co-catalyst comprises an acid selected from a Lewis acid or a Bronsted-Lowry acid.

3. The combination of claim 2, wherein the acid is selected from the group consisting of $Zn^{+2}$, $Fe^{+2}$, $Fe^{3+}$, $Ca^{2+}$, $Mg^{2+}$, $Al^{+3}$, $AlO^+$, $Si^{4+}$, $SiO^{2+}$, $H_3BO_3$, $B(OH)_2(OR)$, $B(OH)(OR)_2$, and mixtures of two or more thereof, wherein R=alkyl, aryl, arylalkyl, heteroaryl, and heteroarylalkyl, where the heteroatoms of heteroayl and heterarylalkyl are selected from nitrogen, oxygen and sulfur.

4. The combination of claim 1, wherein the co-catalyst comprises a base selected from a Lewis base or a Bronsted-Lowry base.

5. The combination of claim 4, wherein the base is selected from the group consisting of $NH_3$, carbamide, urea, hydrazine, primary amines, secondary amines, tertiary amines, pyridines, and mixtures of two or more thereof.

6. The combination of claim 1, wherein the co-catalyst comprises an ionomer or a conducting polymer.

7. The combination of claim 1, wherein the co-catalyst comprises a soluble salt of Cu, Ag, Au, Zn, mixtures of two or more thereof, or oxides thereof.

8. The combination of claim 1, wherein the cathode is in contact with an electrolyte solution comprising the co-catalyst or the co-catalyst is an ionic liquid electrolyte that possesses $HCO_3^-$ or $CO_3^{2-}$ or $H^+$ transport functionality and is in contact with the cathode.

9. The combination of claim 2, wherein the cathode is in contact with the electrolyte solution comprising the co-catalyst and the conductive support further comprises the same co-catalyst.

10. The combination of claim 1, wherein the co-catalyst is an ionic liquid that possesses $HCO_3^-$ or $CO_3^{2-}$ or $H^+$ transport functionality.

11. The combination of claim 1, wherein the conductive support substrate further incorporates a material to be reduced, whereby the electrocatalyst coating catalytically interacts with the material to be reduced incorporated into the conductive support substrate.

12. The combination of claim 11, wherein the material to be reduced comprises carbon dioxide, carbon monoxide, or a mixture thereof.

13. The combination of claim 1 wherein the conductive support substrate is an ionomer or a conducting polymer.

14. A method for generating oxygenated hydrocarbon products from water, carbon dioxide and/or carbon monoxide via an electrolysis reaction, the method comprising:
 (a) placing the cathode of the combination of claim 1 in an electrolyte together with an anode;
 (b) placing the anode and cathode in conductive contact with an external source of electric current;
 (c) providing a source of carbon dioxide and/or carbon monoxide to the cathode; and
 (d) applying the electric current to drive an electrolysis reaction at the cathode, whereby oxygenated hydrocarbon products are generated selectively from the carbon dioxide and/or carbon monoxide.

15. The method of claim 14, wherein the electrocatalyst and co-catalyst are selected to generate a product selected from the group consisting of 2,3-furandiol, 2-formylfuran-3-ol, ethylene glycol, 1,3-propanediol, 1,2-propanediol, stereo-isomers thereof, and combination thereof.

16. The method of claim 14, wherein the source of carbon dioxide and/or carbon monoxide is a flowing source.

17. The combination of claim 1, wherein the co-catalyst binds to a reaction intermediate on the electrocatalyst surface and 1) influences the intermediate's binding orientation, and/or 2) activates the intermediate for subsequent reaction with surface-bound hydrides or other $CO_2/CO$ reaction intermediates, and/or 3) influences the intermediate's binding strength to become stronger or weaker, and/or 4) facilitates the formation of new reaction intermediates on the surface.

18. The combination of claim 1, wherein the co-catalyst comprises a metal selected from the group consisting of Cu, Ag, Au, Zn, and intermetallic compounds thereof.

19. The combination of claim 18, wherein the co-catalytic metal or intermetallic compounds are in the form of nanoparticles.

\* \* \* \* \*